US012397462B2

(12) United States Patent
Aldaz et al.

(10) Patent No.: US 12,397,462 B2
(45) **Date of Patent: *Aug. 26, 2025**

(54) HIGH STIFFNESS BOOSTER FOR ULTRASONIC WELDING APPARATUS WITH A CUTTING BLADE INTEGRATED INTO THE HORN

(71) Applicant: Dukane IAS, LLC, St. Charles, IL (US)

(72) Inventors: Robert E. Aldaz, St. Charles, IL (US); Petr Vasko, Velke Prilepy (CZ); Leo Klinstein, Glenview, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,290

(22) Filed: May 29, 2024

(65) Prior Publication Data

US 2025/0187222 A1 Jun. 12, 2025

Related U.S. Application Data

(63) Continuation-in-part of application No. 18/532,729, filed on Dec. 7, 2023.

(51) Int. Cl.
*B26D 7/08* (2006.01)
*B26D 1/00* (2006.01)

(52) U.S. Cl.
CPC ............ *B26D 7/086* (2013.01); *B26D 1/0006* (2013.01)

(58) Field of Classification Search
CPC .............................. B26D 1/0006; B26D 7/086
(Continued)

(56) References Cited

U.S. PATENT DOCUMENTS 5,183,523 A 2/1993 Rinehart et al.
6,502,372 B1 1/2003 Kaneko et al.
(Continued)

FOREIGN PATENT DOCUMENTS

DE 3218920 A1 11/1983
DE 102019134778 A1 * 6/2021 .............. B06B 3/00
(Continued)

OTHER PUBLICATIONS

Translation KR-20090036290-A (Year: 2025).*
(Continued)

*Primary Examiner* — Nhat Chieu Q Do
(74) *Attorney, Agent, or Firm* — ICE MILLER LLP; Justin D. Swindells

(57) ABSTRACT

An ultrasonic weld/seal-cut system having an ultrasonic cut stack assembly, including an ultrasonic cutting horn with a transducer arranged to impart an ultrasonic energy to the ultrasonic cutting horn (sonotrode) and allow for wider cutting applications while minimizing deflections of the cutting horn under force. The cutting horn has a cutting feature configured to contact a part to be cut and a major surface adjacent to the cutting feature and a booster. The booster can have a generally flat shape and a major surface that is generally coplanar with the major surface of the ultrasonic cutting horn. One or more controllers can be operatively coupled to the ultrasonic cut stack assembly and configured to apply ultrasonic energy through the ultrasonic cut horn via the transducer to cause the cutting feature to move back and forth along its length as the ultrasonic energy is applied by the transducer to the cutting horn. The cutting horn and booster can be a unitary piece, and can be produced by machining a solid plate of metal into the cutting horn with integrated the booster.

19 Claims, 19 Drawing Sheets
(8 of 19 Drawing Sheet(s) Filed in Color)

(58) Field of Classification Search
USPC ........................................................... 83/597
See application file for complete search history.

(56) References Cited

U.S. PATENT DOCUMENTS

| | | | |
|---|---|---|---|
| 7,475,801 B2 | 1/2009 | Johansen et al. | |
| 7,523,775 B2 | 4/2009 | Matsumura | |
| 8,082,966 B2 | 12/2011 | Short | |
| 8,272,424 B2 | 9/2012 | Short | |
| 8,414,723 B2 | 4/2013 | Määttä et al. | |
| 9,205,596 B2 | 12/2015 | Short | |
| 9,346,120 B1 | 5/2016 | Graff et al. | |
| 9,938,033 B2 | 4/2018 | Matheny | |
| 10,029,409 B2 | 7/2018 | Short et al. | |
| 10,391,715 B1 | 8/2019 | Matheny et al. | |
| 10,399,274 B2 | 9/2019 | Short | |
| 10,807,314 B1 | 10/2020 | Klinstein et al. | |
| 11,090,758 B1 | 8/2021 | Klinstein et al. | |
| 11,426,946 B2 | 8/2022 | Klinstein et al. | |
| 2012/0012258 A1 | 1/2012 | Vogler | |
| 2021/0370613 A1 * | 12/2021 | Klinstein | B29C 66/73921 |

FOREIGN PATENT DOCUMENTS

| | | | | |
|---|---|---|---|---|
| EP | 2292411 A2 * | 3/2011 | B29C 65/086 |
| EP | 3099468 A1 | 12/2016 | |
| JP | S6082328 A | 5/1985 | |
| JP | H01133718 A | 5/1989 | |
| KR | 20090036290 A * | 4/2009 | |
| WO | WO-2012156475 A2 * | 11/2012 | B06B 3/00 |
| WO | WO-2022035225 A1 * | 2/2022 | B23K 20/10 |

OTHER PUBLICATIONS

WO-2022035225-A1, Translation (Year: 2025).*
DE-102019134778-A1, Translation (Year: 2025).*
WO-2012156475-A2, Translation (Year: 2025).*
Widmann Maschinen GmbH & Co. KG, "The Widmann PM-Series, Manufacturing a Variety of Pouches by Using the Ultrasonic Technology", <https://www.widmann-maschinen.com/en/machines/series-produced-machines/packaging>, retrieved Jul. 20, 2020, 7 pages.
Extended European Search Report in Patent Application No. EP 21171661.8, Sep. 10, 2021, 18 pages.
International Search Report and Written Opinion for PCT/US2022/040348, Jan. 23, 2023, 25 pages.

* cited by examiner

HIGH STIFFNESS BOOSTER FOR ULTRASONIC WELDING APPARATUS WITH A CUTTING BLADE INTEGRATED INTO THE HORN

CROSS-REFERENCE TO RELATED APPLICATION

This is a continuation-in-part of U.S. patent application Ser. No. 18/532,729 filed Dec. 7, 2023, which is hereby incorporated herein by reference in its entirety.

BACKGROUND OF THE INVENTION

In traditional ultrasonic welding, one ultrasonic stack is energized, and a part is pressed between the energized stack and a non-energized anvil. The traditional configuration of an ultrasonic stack assembly includes a transducer coupled to an ultrasonic booster, which is coupled to an ultrasonic horn (or sonotrode). The ultrasonic booster typically has a cylindrical or round shape (and so does the transducer), and the round cross-section of the booster abuts against an end of the ultrasonic horn. An example of such cylindrical boosters can be seen in U.S. Pat. No. 11,426,946 (see, e.g., FIGS. 5A, 6A). Ultrasonic sonotrodes of this type can experience significant deflections under high side-loaded forces. Moreover, as there are multiple interfaces between the horn, boosters, and transducers, these interfaces can over time become failure points due to heating, wear, and improper frequency tuning. The tendency to deflect under high side-loaded forces also limits the overall width of surfaces available for welding, thereby limiting the type of parts and applications using ultrasonic welding.

A need exists for a stiffer horn assembly with reduced deflections under high forces and longer available width for welding surfaces. The present disclosure addresses this and other needs.

SUMMARY OF THE INVENTION

The ultrasonic horns disclosed herein have greater vertical cross section, which results in a greater cross-sectional moment of inertia providing much greater stiffness (i.e., much less deflection) compared to existing ultrasonic horns. The horn structure also provides a greater weld area compared to existing horns. The horn features an integrated planar booster that can be machined out of a solid metal plate, thereby simplifying operation compared to cylindrical-type boosters while still minimizing the total number of interfaces among the booster, transducer, and horn. This integrated structure also minimizes machining time and wasted material. Moreover, the greater stiffness allows the overall welding width of the horn to be increased.

According to an aspect of the present disclosure, an ultrasonic welding system having an ultrasonic stack assembly, includes: an ultrasonic stack assembly including an ultrasonic horn and a first transducer arranged to impart a first ultrasonic energy into the ultrasonic horn, the ultrasonic horn having a first part-interfacing surface configured to contact a part to be joined, the ultrasonic horn having a major surface adjacent to the first part-interfacing surface and an ultrasonic booster having a generally flat shape and a major surface that is generally coplanar with the major surface of the ultrasonic horn; one or more controllers operatively coupled to the ultrasonic stack assembly, the one or more controllers operatively being configured to: apply the first ultrasonic energy through the ultrasonic horn via the first transducer to cause the first part-interfacing surface to move back and forth along its length as the first ultrasonic energy is applied by the first transducer to the horn.

The ultrasonic horn and the ultrasonic booster can be machined from a single plate of metal such that the ultrasonic horn and the ultrasonic booster constitute a single, integrated piece.

The ultrasonic stack assembly can include a second transducer arranged to impart a second ultrasonic energy into the horn. The one or more controllers can be configured to cause the second ultrasonic energy to be applied through the ultrasonic horn simultaneously with the first ultrasonic energy. The first and second ultrasonic energies can be synchronized in at least one of frequency or phase.

The first and second ultrasonic energies can be synchronized in both frequency and phase.

The ultrasonic horn has a length along a side thereof and a width along an end thereof, the length being longer than the width, and the ultrasonic booster can extend away from the end of the ultrasonic horn, the end being interfaced with the first transducer. The ultrasonic horn and the ultrasonic booster can have a generally flat profile along coplanar surfaces thereof.

A weld or can be is formed at the first part-interfacing surface without application of any external heat energy toward the weld or seal.

The ultrasonic horn can have a second part-interfacing surface along an opposite side to a side of the first part-interfacing surface.

The ultrasonic welding assembly can further include a fixed bearing mount through which a portion of the ultrasonic booster passes to interface with the first transducer.

The ultrasonic horn can have a second part-interfacing surface that is on an opposite side of the first part-interfacing surface. The one or more controllers can be configured to cause the ultrasonic horn to rotate while at least the first ultrasonic energy is imparted to at least one of the first part-interfacing surface or the second part-interfacing surface. The ultrasonic horn can include a cutting element arranged relative to the first part-interfacing surface and configured to score or cut a portion of the part to be joined.

The ultrasonic horn can include a compliant tab that is internal to the horn and configured to connect with a plate arranged on an exterior of the ultrasonic horn. The tab can be a multiple tabs, each being internal to the horn and configured to connect with respective mounting points on the plate to provide a node to inhibit internal movement or deflection of the ultrasonic horn relative to anti-nodal points along the ultrasonic horn.

A part can be made using the systems or methods disclosed herein. The part can have a height of at least 40 mm.

The portion of the ultrasonic booster that passes through the fixed bearing mount can modify a vibrational amplitude passing between the first transducer and the ultrasonic horn such that the portion of the ultrasonic booster has a reduced width dimension relative to an overall width dimension of the ultrasonic horn. The modification can be a tuned half-wave component relative to the first ultrasonic energy. The compliant tab can extend into an opening in the horn formed along an internal surface of the horn and is attached to the plate.

The ultrasonic booster can be coupled to the ultrasonic horn and to the first transducer. The ultrasonic booster can have a generally square or rectangular cross-section.

The ultrasonic horn can be at least two ultrasonic horns positioned side by side relative to one another, each of the at least two ultrasonic horns being integrated with or coupled to a generally flat ultrasonic booster. The ultrasonic transducer assembly can include a second transducer coupled to a second of the at least three ultrasonic horns. The first transducer and the second transducer can be on opposite sides of the ultrasonic transducer assembly.

The ultrasonic horn can be at least two ultrasonic horns positioned side by side relative to one another, each of the at least two ultrasonic horns being integrated with or coupled to a generally flat ultrasonic booster. The ultrasonic transducer assembly can include a second transducer coupled to a second of the at least three ultrasonic horns, the first transducer and the second transducer being on the same side of the ultrasonic transducer assembly.

The ultrasonic booster can be a tuned as a half-wave component.

The system can further include an anvil arranged at a distance from the first part-interfacing surface of the ultrasonic horn, the anvil including a cutting element arranged relative to a part-interfacing surface of the anvil and configured to score or cut a portion of the part to be joined.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
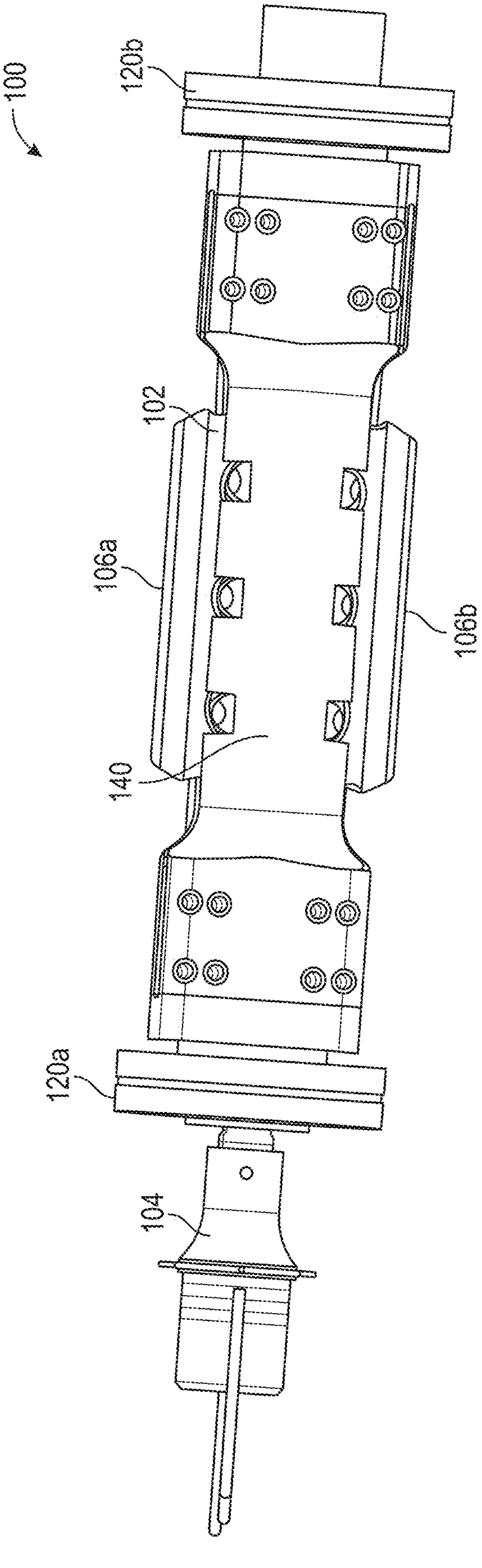
FIG. 1A illustrates an ultrasonic stack assembly including a horn with an integrated flat booster surrounded by side plates according to an aspect of the present disclosure. Optional fasteners are not shown for ease of illustration.

A key feature of the present disclosure is the shape or profile of the ultrasonic booster. Conventional boosters have a cylindrical shape with a round or circular cross-section and when used are coupled between the ultrasonic transducer and the ultrasonic horn. According to the present disclosure, the booster herein has a generally flat profile that is coplanar with the horn and has a non-round cross-section, such as square or rectangular.

Typically, the ultrasonic transducer is connected in line with an ultrasonic booster and a sonotrode (also commonly called a "horn" in the ultrasonic welding industry), both of which are normally tuned to have a resonant frequency that matches that of the ultrasonic transducer (sometimes called a converter). A typical ultrasonic booster, which is structured to permit mounting of the ultrasonic transducer assembly (or "stack" as it is commonly called), is typically a tuned half-wave component that is configured to increase or decrease the vibrational amplitude passed between the converter (transducer) and sonotrode (horn). The amount of increase or decrease in amplitude is referred to as its gain. The horn, which is typically in the shape of a tapering metal bar, is structured to augment the oscillation displacement amplitude provided by the ultrasonic transducer and thereby increase or decrease the ultrasonic vibration and distribute it across a desired work area. An ultrasonic generator generates the energy to the transducer, an example of which is described in U.S. Pat. No. 7,475,801 and is commercially available from Dukane under any of the iQ™ line of ultrasonic generators.

As described further below, the ultrasonic booster according to the present disclosure can be formed as an integral piece with the ultrasonic horn, such as machined from a single piece of metal, or can be coupled directly to the horn. The booster according to the present disclosure has a generally flat profile having a relatively small footprint but relatively high stiffness. The greater height and orientation of the greater cross-sectional moment of inertia corresponds to the direction in which the load is applied during normal operation. This orientation maximizes the effective stiffness while minimizing the horn's complexity. The booster design according to the present disclosure allows a wider welding surface, for example, such that a part-interfacing surface of the horn can be lengthened to suit wider welding applications without compromising a stiffness across a length of the horn. Moreover, the booster according to the present disclosure reduces a total number of interfaces along the entire assembly. Non-limiting applications of the assemblies disclosed herein include flow wrap seal packaging applications or any other application where consistent application and increased weld depth across the entire width of the part to be joined is important, such as thin-film, ultrasonic metal welding, and non-woven materials applications. Advantageously, the booster of the present disclosure allows the same assembly to be used for both thick and thin parts to be joined.

FIG. 1A is an ultrasonic welding system having an ultrasonic stack assembly 100 for applying ultrasonic energy to parts to be joined together by application of the ultrasonic energy through an ultrasonic horn 102. Those skilled in the art of ultrasonic welding will appreciate that a typical ultrasonic welding system includes a fixed frame (not shown) along with other components such as one or more anvils (see, e.g., the anvil 150 shown in FIG. 1F) to receive parts to be joined. These components are not necessary for an understanding of the invention and for ease of illustration, only the main components (e.g., transducer, booster, horn) are shown.

Figure 1B:
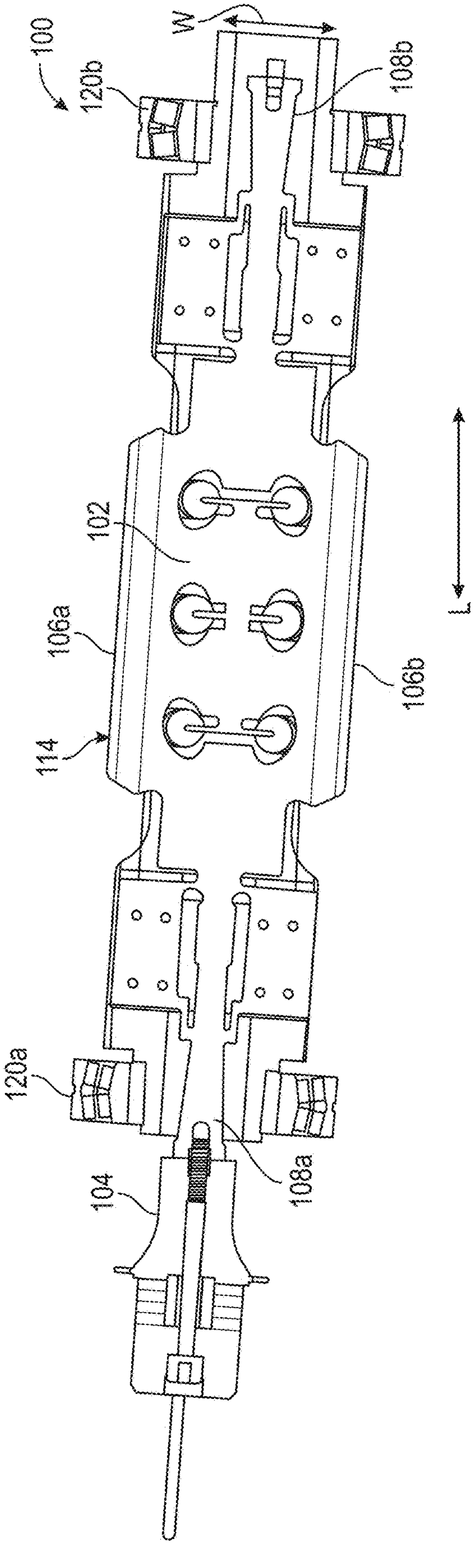
FIG. 1B is a cross-sectional view of the ultrasonic stack assembly shown in FIG. 1A with the side plates removed.

The ultrasonic stack assembly 100 includes a first ultrasonic transducer 104 (variously referred to as a converter), and referring to FIG. 1B, a first ultrasonic booster 108*a*, an optional second ultrasonic booster 108*b*, and the ultrasonic horn 102 (sometimes referred to as a horn or sonotrode for brevity). An optional second ultrasonic transducer (not shown) can be positioned on the end of the assembly opposite to the end where the first ultrasonic transducer 104 is shown mounted to the booster 108*a*. In applications where only one ultrasonic booster is needed, the second ultrasonic booster 108*b* can be eliminated. In applications where a second ultrasonic transducer is desired, the second ultrasonic transducer can be mounted to the end 116 (see FIG. 1D) of the assembly 100.

The ultrasonic horn or sonotrode 102 has a first part-interfacing surface 106*a* configured to contact a part (not shown) to be joined. The ultrasonic horn 102 has a major surface 110 (best seen in FIG. 1C) adjacent to the first part-interfacing surface 106*a*. Each of the first and optional second ultrasonic boosters 108*a*, 108*b* has a generally flat shape and a major surface 112*a*, 112*b* that is generally coplanar with the major surface 110 of the ultrasonic horn 102. Those familiar with the art of ultrasonic welding will appreciate that the parts to be joined are introduced between the first part-interfacing surface 106*a* or 106*b* and one or more anvils (not shown) while the ultrasonic energy from the transducer 104 is imparted through the horn 102. By "major surface," it is meant that a continuous surface exceeds other surfaces of the structure. For example, compared to the part-interfacing surface 106*a*, 106*b*, which is generally elongated and narrow, the major surface 110 of the ultrasonic horn 102 has a much larger surface area by comparison. The part-interfacing surfaces 106*a*, 106*b* of the horn 102 would not be considered to be a major surface of the horn 102. Likewise, the booster 108*a* has a major surface 112*a* (see FIG. 1C), which has a greater surface area, for example, compared to an end surface of the booster 108*a*, which is coupled at an interface 120 to the transducer 104. The end of the booster 108*a* would not be considered a major surface of the booster 108*a*.

A key feature of the boosters 108*a*, 108*b* according to the present disclosure is that unlike prior art boosters, each of these boosters 108*a*, 108*b* is generally flat and has a non-circular cross-section. Conventional boosters have a circular or round cross-section and have a volumetric cylindrical form. The boosters 108*a*, 108*b* of the present disclosure are generally flat. By generally flat, it is meant that to the skilled person, the overall major surface 112*a*, 112*b* of the booster 108*a*, 108*b*, respectively, is flat, even though there may be undulations or other non-flat features along the surface. The majority of the surface lies in one plane, even though there may be perturbations, slight protrusions, dips, holes, channels, etchings, or similar features extending out of the plane in other areas of the same surface. Such relatively minor deviations from the plane of the major surface 112*a*, 112*b* are not intended to fall outside the scope of what is meant by "generally" flat. In the illustrations shown in FIGS. 1A-1D, the major surface 112*a*, 112*b* is completely flat and lies in the same plane as the major surface 110 of the horn 102.

The ultrasonic welding system conventionally includes one or more controllers (not shown) operatively coupled to the ultrasonic transducer assembly 100. The one or more controllers are configured to apply the first ultrasonic energy through the ultrasonic horn 102 via the first transducer 104 to cause the first part-interfacing surface 106*a*, 106*b* to move back and forth along its length, L (see FIG. 1B) as the first ultrasonic energy is applied by the first transducer 104 to the horn 102. This back and forth motion can be colloquially referred to as a "scrubbing" motion due to its resemblance to the same. Another form of motion that is contemplated by the present disclosure involves an extending motion at the part-interfacing surface rather a than back-and-forth scrubbing motion. Coupled with the imparting of ultrasonic energy to the parts to the joined, the scrubbing motion along the length, L, of the part-interfacing surface 106*a*, 106*b* ensures a uniform and rapid joining of the parts without any external matter or heat or from any other external energy source (except via the transducer 104) being applied to the parts. The one or more controllers can control amplitude, frequency and/or a phase of the ultrasonic energy outputted by the transducer 104, whose amplitude can be adjusted (increased or decreased) by the booster 108*a*, 108*b* before being transmitted to the sonotrode or horn 102. This is due to the greater vertical cross-section having a greater cross-sectional moment of inertia, which provides much greater stiffness compared to conventional ultrasonic transducer assemblies. The horn 102 disclosed herein provides for a uniform amplitude distribution along the horn's length, compared to conventional horns. Such increased uniform amplitude along with the scrubbing motion enables the welding of thinner and more fragile films and materials compared to conventional designs.

The booster 108*a*, 108*b* can be integrated with the horn 102 or can be a separate piece that is attached or coupled to the horn 102. In the example shown in FIGS. 1A-1D, the horn 102 and the booster 108*a*, 108*b* are machined or milled from a single plate of metal such that the ultrasonic horn 102 and the ultrasonic booster 108*a* or 108*b* constitute a single, integrated piece. In this case, no coupling or interfacing of the horn 102 to the booster 108 is required as the booster transitions directly to the horn without requiring any additional interfacing. This integrated embodiment provides increased overall stiffness compared to conventional booster-horn couplings, significantly suppressing deflections or deformations of the assembly 100 under large forces (e.g., up to 2-4 times less deflection when subjected to 3000 N of weld force).

An optional second transducer (not shown) like the transducer 104 can be arranged to impart a second ultrasonic energy into the horn 102. The optional second transducer is coupled to the booster 108*b* in the same manner as the first transducer 104 is coupled to the booster 108*a*. The one or more controllers are configured to cause the second ultrasonic energy to be applied through the ultrasonic horn 102 simultaneously with the first ultrasonic energy from the first transducer 104. The first and second ultrasonic energies can be synchronized in frequency or phase or both frequency and phase.

The ultrasonic horn 102 has a length, L (FIG. 1B), along a side thereof and a width, W, along an end thereof, where L>W. The third dimension can be referred to as a depth, thickness, or height of the horn 102. The ultrasonic booster 108*a*, 108*b* extends away from the end (which can be an internal area) of the horn 102, which interfaces with the first transducer 104 at the interface 120. The ultrasonic horn 102 and the ultrasonic booster 108*a*, 108*b* have a generally flat profile along coplanar surfaces 110, 112*a* or 110, 112*b* of the horn 102 and boosters 108*a*, 108*b*, respectively.

Figure 1C:
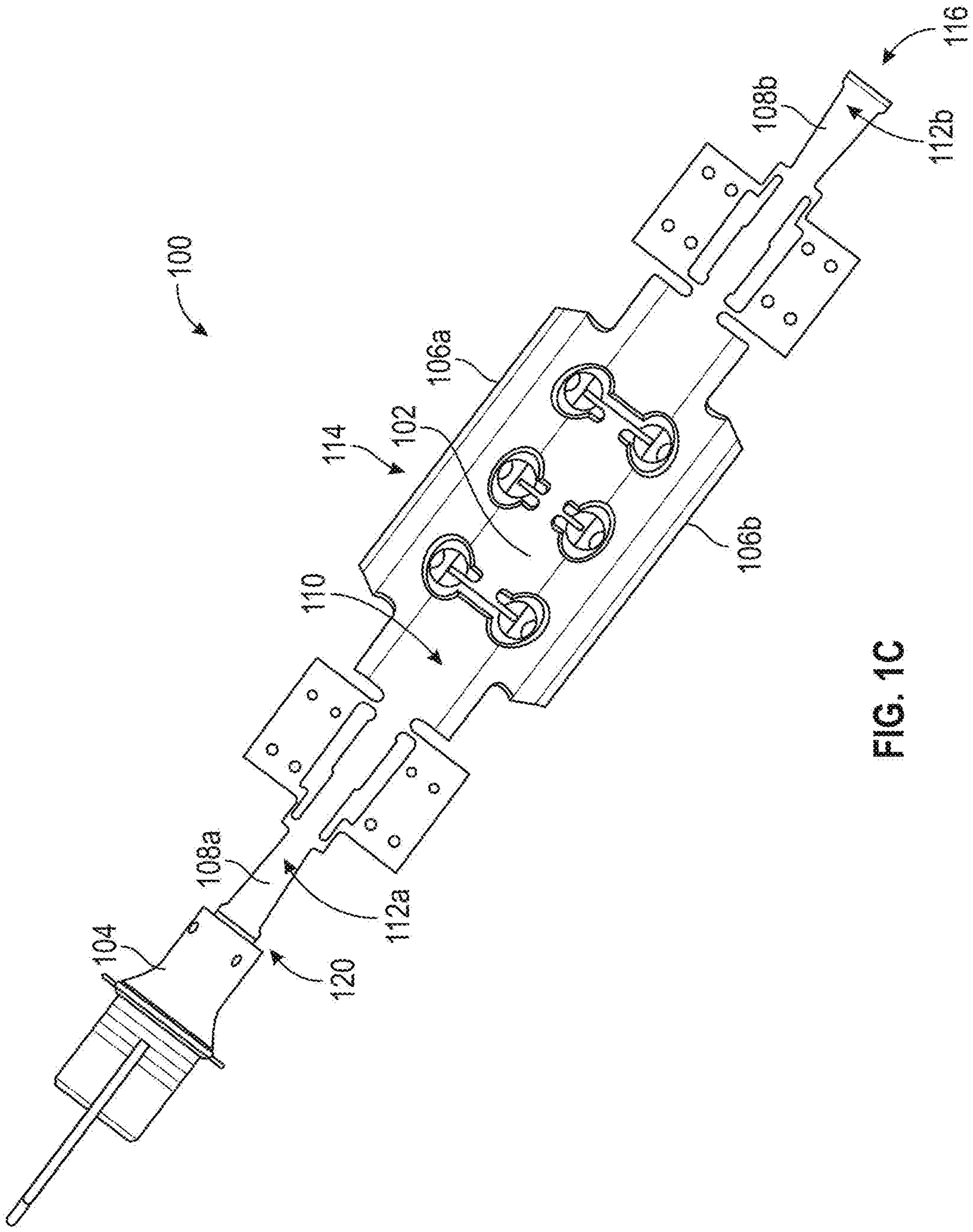
FIG. 1C is a perspective view of portions of the ultrasonic stack assembly shown in FIG. 1A with the side plates and fixed mounts removed to reveal the ultrasonic horn and flat ultrasonic booster.
Figure 1D:
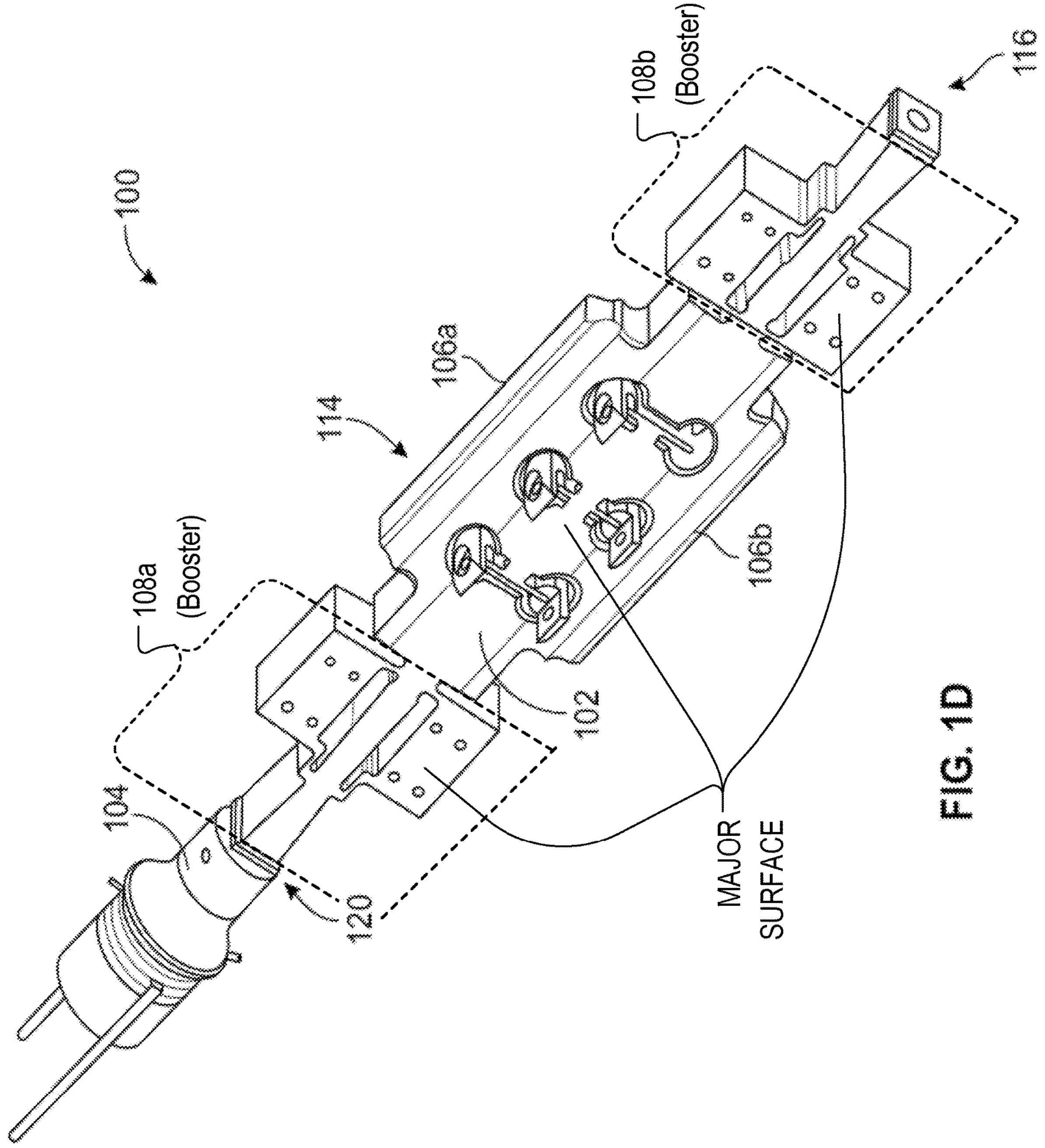
FIG. 1D is a perspective view of the same assembly shown in FIG. 1C rotated slightly to reveal other details of the assembly.

The optional second part-interfacing surface 106*b* of a horn 102 is along an opposite side to a side of the first part-interfacing surface 106*a*, as best seen in FIG. 1C. In this example, the horn 102 can be rotated so that two sets of parts can be joined with each full rotation of the horn 102 relative to a longitudinal axis running along the length, L, of the horn 102.

The ultrasonic welding assembly 100 includes a fixed bearing mount 120*a*, 120*b* (FIG. 1A) through which a portion of the ultrasonic booster 108*a*, 108*b*, respectively, passes to interface with the first transducer 104 at the interface 120 (in the case of the booster 108*a*). A similar interface would be present between an optional second transducer (not shown) and the booster 108*b*.

Figure 1E:
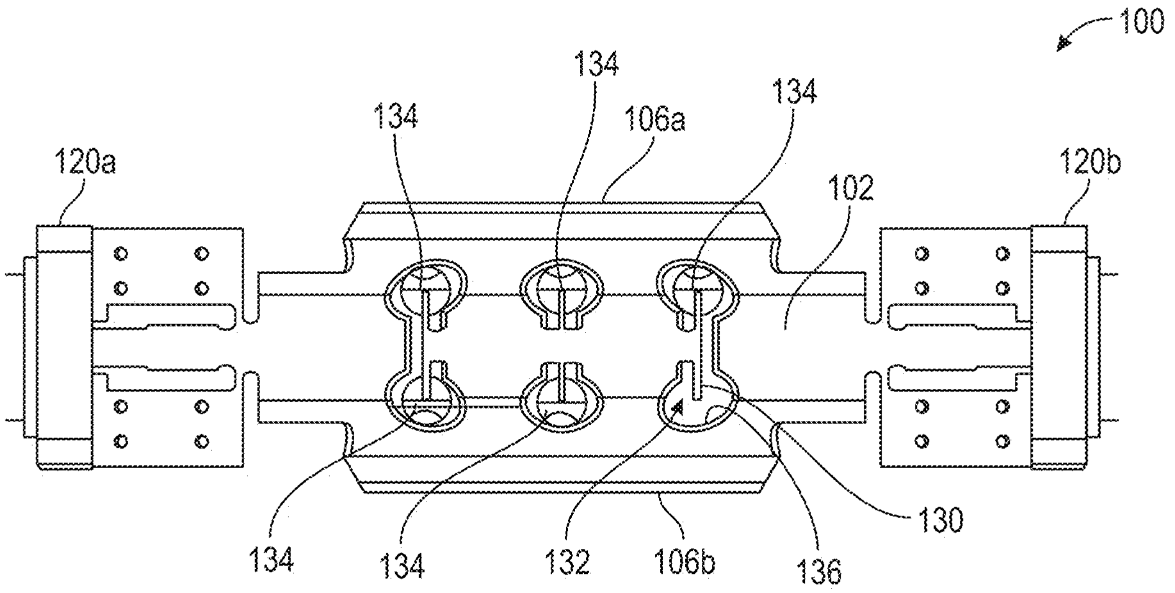
FIG. 1E is a top view of a portion of the horn shown in FIG. 1C with the side plate removed to reveal optional compliant mounting tabs with attachments to secure the stack to the side plates shown in FIG. 1A. The optional compliant mounting tabs and corresponding bars 134 further reduce deflection by minimizing the unsupported span of the horn but are not essential to invention.

As can be best seen in FIG. 1E, the ultrasonic horn 102 includes a compliant tab 130 that is internal (see internal surface 136) to the horn 102 and configured to connect with a plate 140 (FIG. 1A) arranged on an exterior of the ultrasonic horn 102. In the example shown in FIG. 1E, there are six compliant tabs 130, but fewer or more tabs can be used depending on the number of desired nodes and anti-nodes for a particular application. The tab 130 is internal to the horn 102, as can be seen in FIG. 1E, and can flex thanks to a surrounding opening 132 that allows movement of the tab 130. The tab 130 is coupled to a mounting device 134, which in turn is secured to the side plate 140 provided on an exterior of the horn 102. The side plate 140 adds additional rigidity or stiffness to the assembly 100. Each tab 130 operates as a node to inhibit internal movement or deflection of the ultrasonic horn 102 relative to anti-nodal points along the ultrasonic horn 102, as discussed further below. For example, the tabs 130 operate to inhibit up and down (vertical) movement of the horn but allow more lateral (horizontal) movement to facilitate the back and forth scrubbing motion.

As can be seen in the cross-sectional view of FIG. 1B, the portion of the ultrasonic booster 108*a* that passes through the fixed bearing mount 120*a* modifies a vibrational amplitude passing between the first transducer 104 and the ultrasonic horn 102 such that the portion of the ultrasonic booster 102 has a reduced width dimension, W, relative to an overall width dimension of the ultrasonic horn. As shown in FIG. 1B, the length, L, of the horn 102 is longer than the width, W, and the part-interfacing surfaces 106*a*, 106*b* extend along the length, L, of the horn 102 orthogonal to its width, W. The compliant tabs 130 extend along the width, W, as shown in FIG. 1E, to facilitate the back and forth motion along the part-interfacing surfaces 106*a*, 106*b* of the horn 102 while the ultrasonic energy is being imparted therethrough by the transducer 104. For example, the modified amplitude can correspond to a tuned half-wave component relative to the first ultrasonic energy originating from the transducer 104.

As mentioned above, the ultrasonic booster 108*a* does not have to be integrated with the horn 102 and alternately can be coupled to the ultrasonic horn 102 and to the first transducer 104. The ultrasonic booster has a generally square or rectangular cross-section near its interface 120 (see FIGS. 1C and 1D) to the transducer 104. This cross-section contrasts with conventional boosters, which have a round or circular cross-section at or near the interface with a transducer.

Figure 1F:
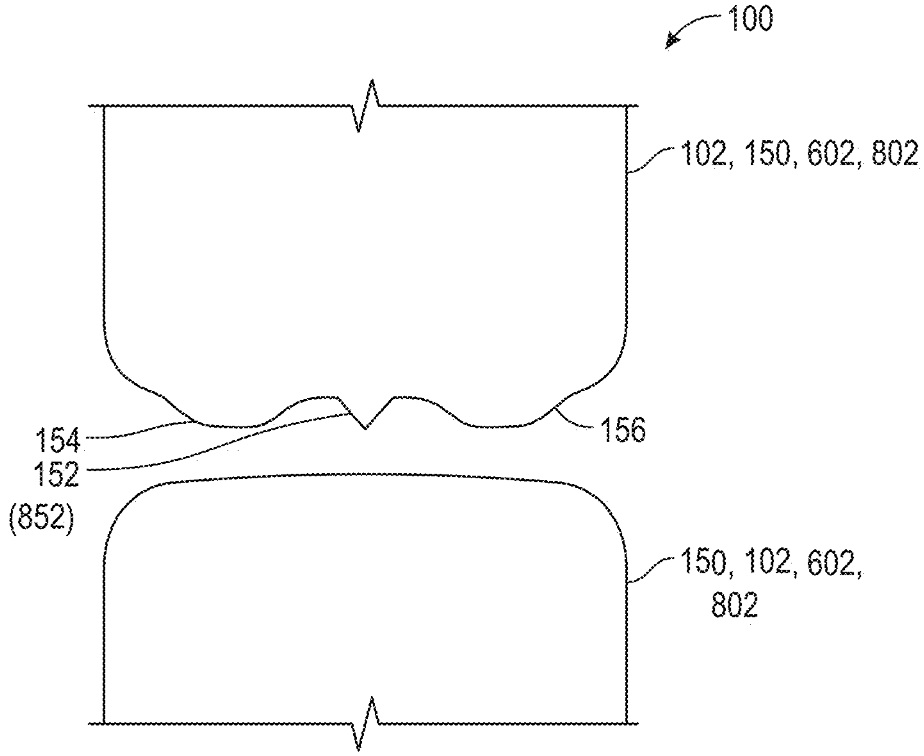
FIG. 1F is an illustration of a horn/anvil configuration capable of performing a cut-and-seal operation that joins portions of parts together while scoring or cutting through the parts to separate them.
Figure 8A:
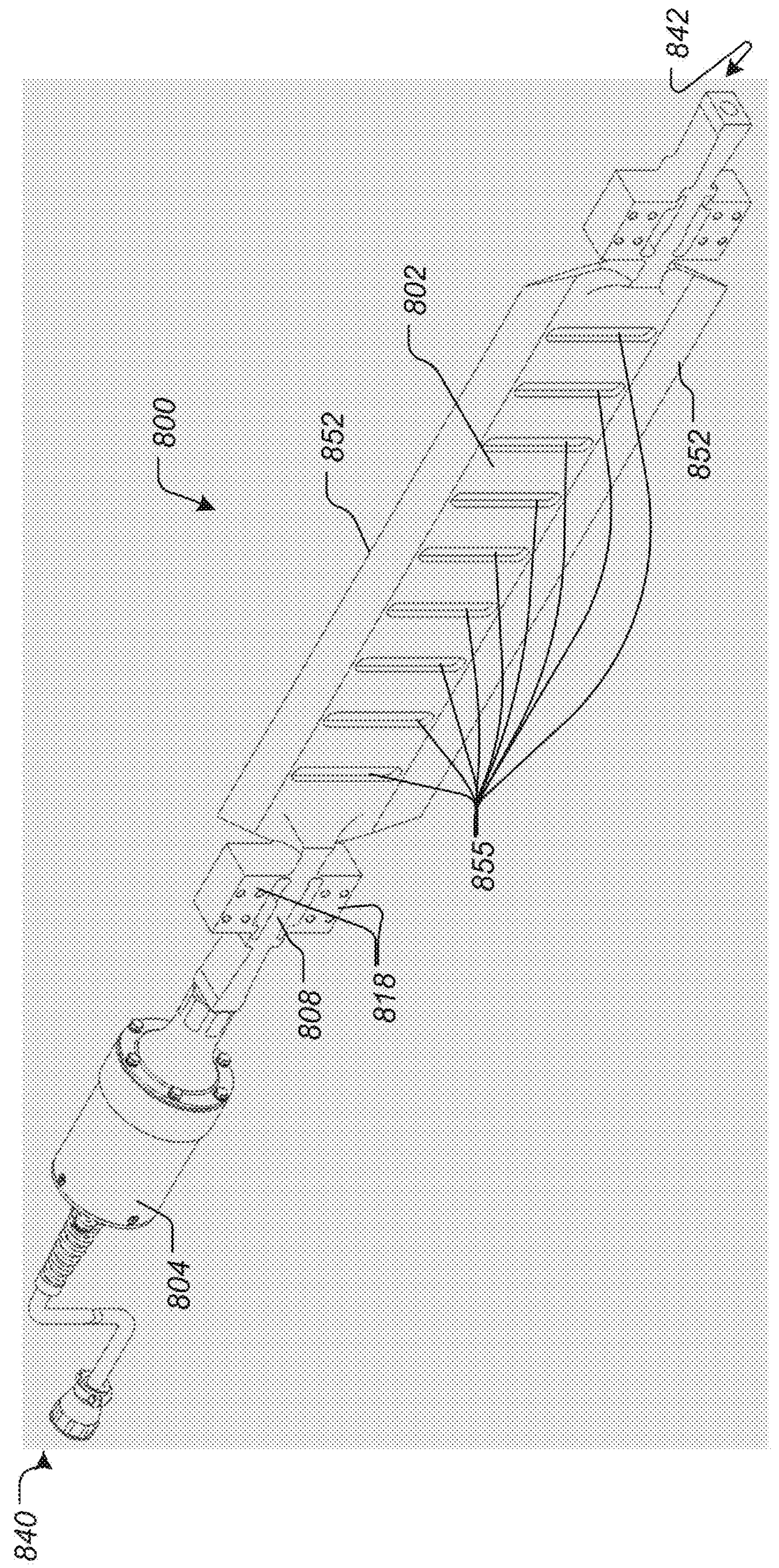
FIG. 8A illustrates a perspective view of an example arrangement of a cutting horn assembly according to the present disclosure with a transducer on one side of the assembly.
Figure 8B:
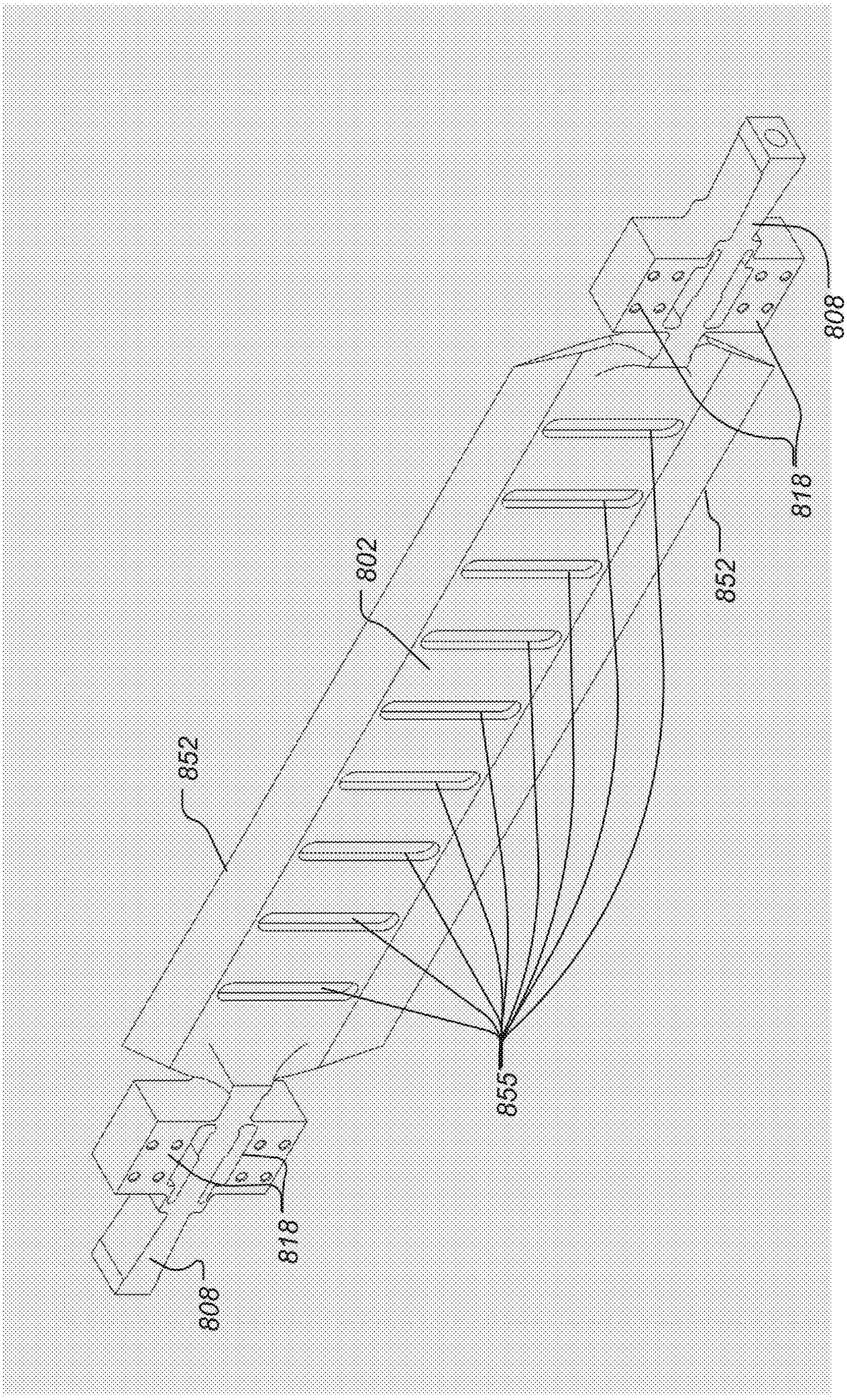
FIG. 8B illustrates a perspective view of a cutting horn with integrated planar boosters and cutting features included in the cutting horn assembly of FIG. 8A.
Figure 8C:
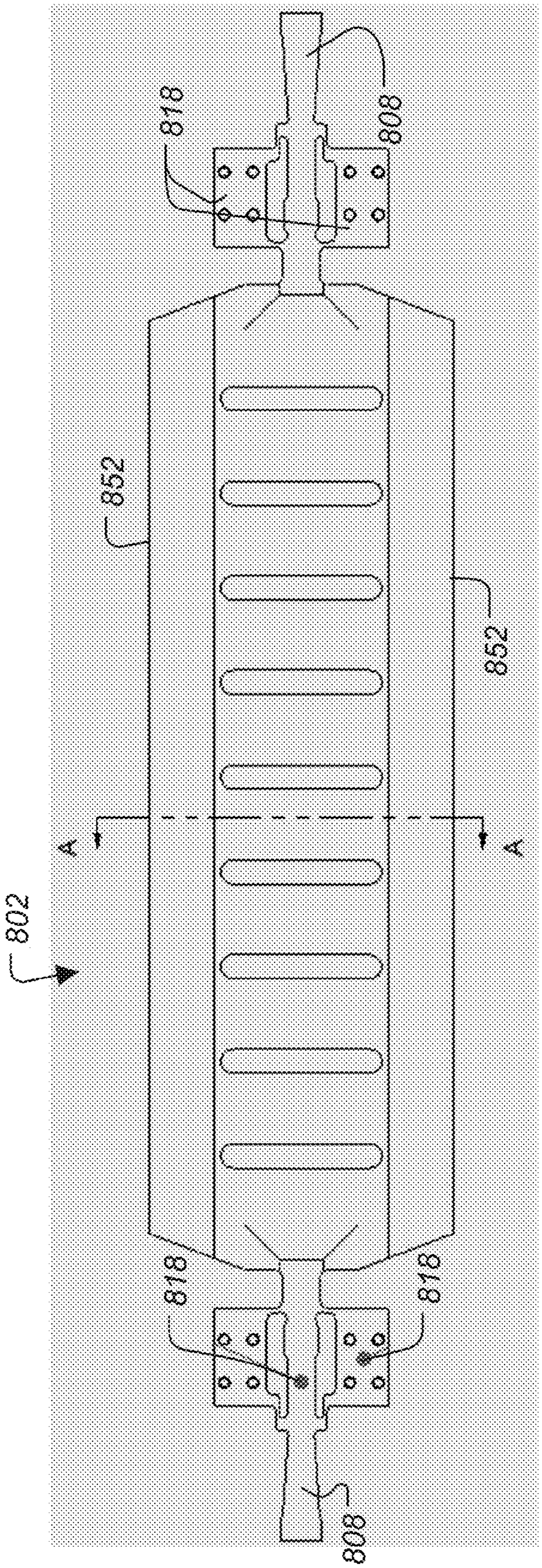
FIG. 8C illustrates a side view of the cutting horn of FIG. 8B, including integrated planar boosters and cutting features.

The present disclosure also contemplates an implementation of the assembly 100 in which a cut-and-seal operation is carried out. Those skilled in the art of ultrasonic welding will appreciate the term "cut-and-seal" refers to an operation in which parts are joined or sealed together while also being scored or cut to separate them (e.g., candy bar wrappers or non-woven materials for hygiene products). The term "cut" can refer to scoring in which such a small amount of remaining material persists after the scoring that the two parts can be readily separated. The term seal can refer to hermetic sealing or a sealing that creates an air- or water-tight seal at the sealed interface. Shown in FIG. 1F are two structures labeled 102, 150, 602, and shown in FIGS. 8A-8C is a structure labeled 802. The upper structure can be a horn 102, an anvil 150, a horn 602, or a horn 802, while the lower structure can be an anvil 150, a horn 102, a horn 602, or a horn 802. In other words, both the upper and lower structures can both be horns (e.g., 102, 602, 802) or one of the upper/lower structures can be an anvil 150. Referring to the upper structure, a scoring or cutting element 152 is shown in a central area of the part-interfacing surface of the horn/anvil 102, 150, 602, 802, which also has two part-interfacing surfaces 154, 156 on either side of the scoring or cutting element 152, such as a blade. The cutting element 152 is about 20-30 um shorter than a protruding depth of the part-interfacing surfaces 154, 156 to minimize wear on the blade while still scoring or cutting the film passing between the upper and lower structures.

While only one horn 102 is shown in the assembly 100 in FIGS. 1A-1E, FIG. 6 illustrates an alternative assembly 600 comprising a plurality of ultrasonic welding subassemblies 600*a*, 600*b*, 600*c*, and 600*d*, which include multiple respective horns 602*a*, 602*b*, 602*c*, 602*d* with integrated boosters 608*a*, 608*b*, 608*c*, 608*d* and 608*e*, 608*f*, 608*g*, 608*h* like the horn 102 and boosters 108*a*, 108*b* shown in FIGS. 1A-1E (the optional mounting plate has been removed for ease of illustration). In at least one example arrangement, one or more ultrasonic cutting horn assemblies 800 (discussed below) can be included instead of, or in addition to, the ultrasonic welding assemblies 600*a*, 600*b*, 600*c*, and/or 600*d*. While four are shown, the present disclosure contemplates any number of stacked arrangements of horn with boosters, including two, three, five, six, or more, including any combination of ultrasonic welding assemblies 600 and ultrasonic cutting horn assemblies 800.

Figure 6:
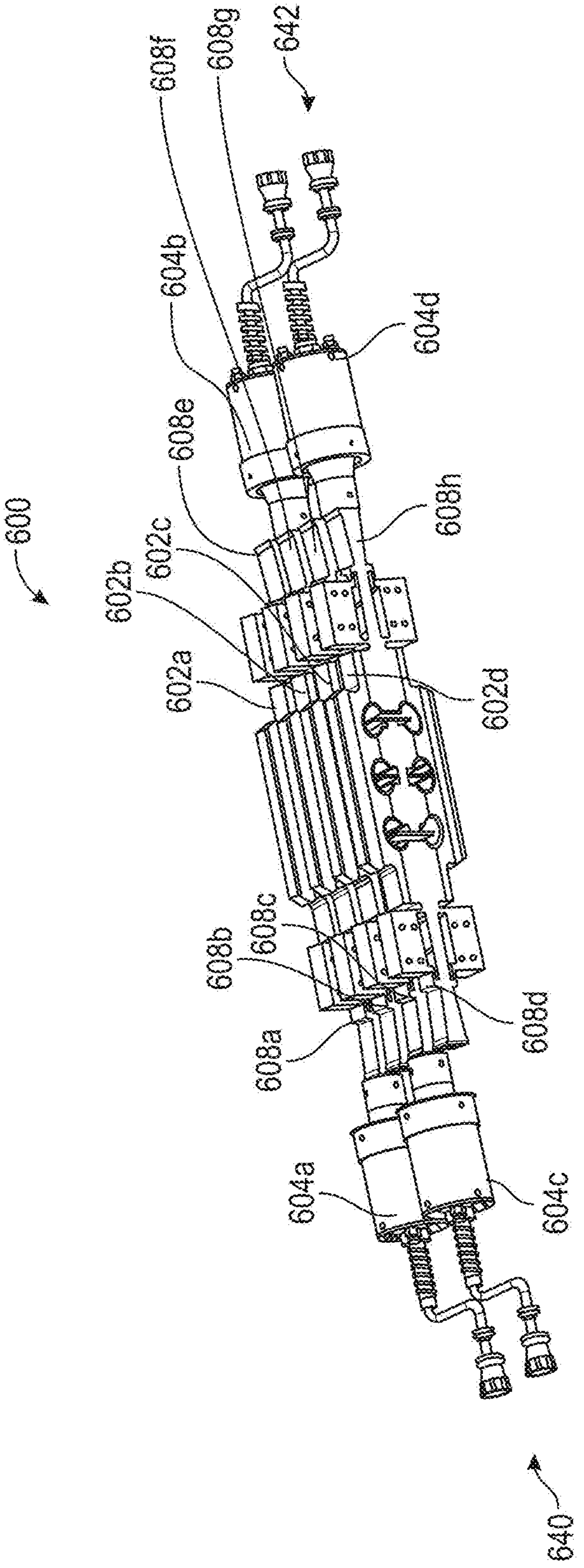
FIG. 6 is an example arrangement of multiple horns according to the present disclosure positioned side-by-side with transducers on alternating ones of the horns on both sides of the assembly.

In the example arrangement depicted in FIG. 6, each of the horns 602*a*, 602*b*, 602*c*, 602*d* are positioned side by side relative to one another and are integrated with or coupled to a generally flat ultrasonic booster 608*a*, 608*b*, 608*c*, 608*d*, 608*e*, 608*f*, 608*g*, 608*h*. The transducers are coupled to every other booster as follows. A first transducer 604*a* is coupled to a first booster 608*a* on a first side 640 of the assembly 600. A second transducer 604*b* is coupled to a second booster 608*e* on the opposite side 642 of the assembly 600. A third transducer 604*c* is coupled to a third booster 608*c* on the first side 640 of the assembly 600. A fourth transducer 604*d* is coupled to a fourth booster 604*d* on the opposite side 642 of the assembly 600. This arrangement allows pairs of transducers on each side 640, 642 of the assembly 600 to cooperate in a push-pull scrubbing motion along the respective part-interfacing surfaces of the horns 602*a*, 602*b*, 602*c*, 602*d*. As can be seen in this illustration, the horns 602*a*, 602*b*, 602*c*, 602*d* can be positioned very close to one another thanks to the flat form factor of the booster 608, which does not become a limitation on the spacing between the adjacent horns 602. The transducers 604, when they have a larger cross-sectional area compared to the horn/booster 602/608, can be coupled to alternating boosters as shown on either side of the assembly 600.

Figure 7:
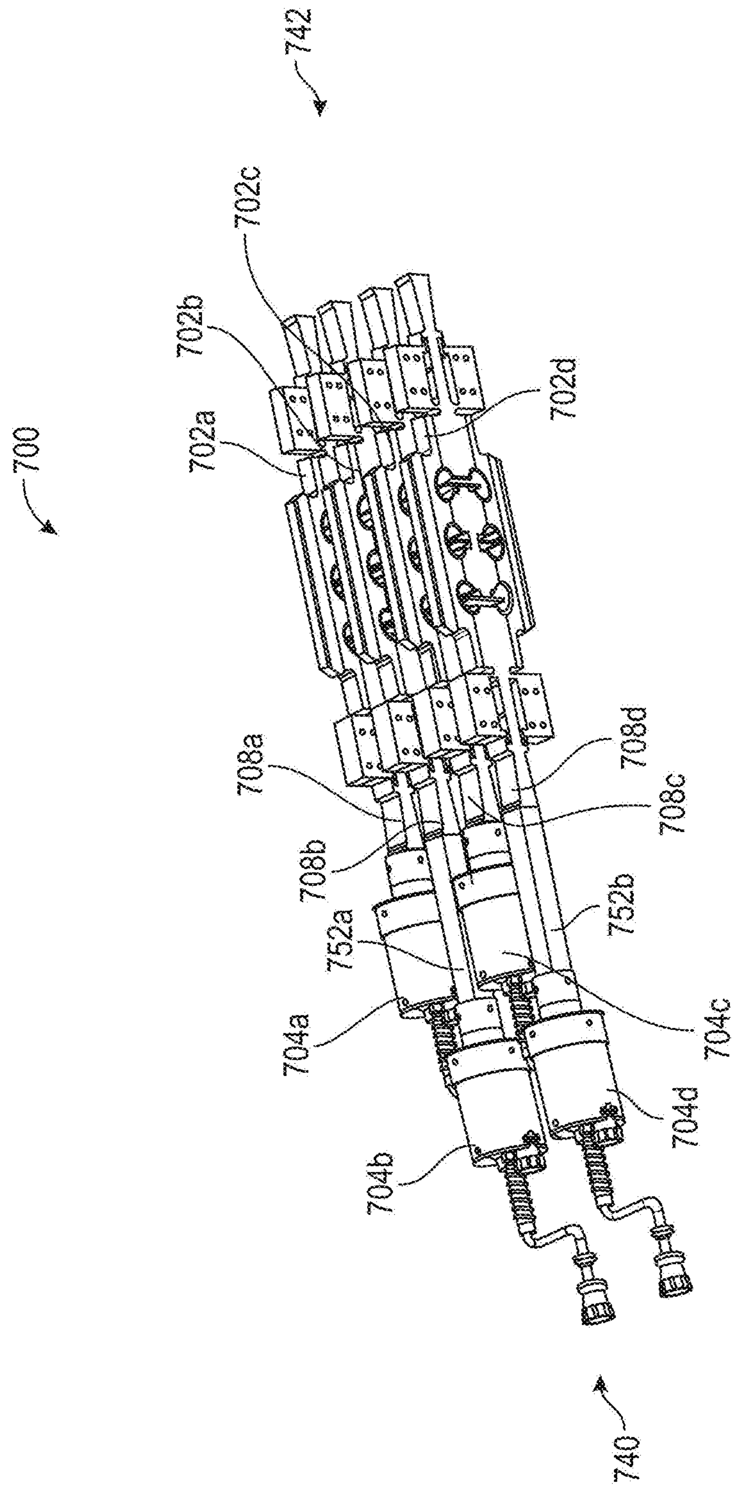
FIG. 7 is another example arrangement of multiple horns according to the present disclosure positioned side-by-side with one transducer on each horn on the same side of the assembly.

FIG. 7 illustrates an alternative mounting configuration of an ultrasonic transducer assembly 700 having a plurality of ultrasonic welding subassemblies 700*a*, 700*b*, 700*c*, and 700*d*, including multiple horn/booster devices and transducers arranged on one side 740 of the assembly 700. In at least one example arrangement, one or more ultrasonic cutting horn assemblies 800 (discussed below) can be included instead of, or in addition to, the ultrasonic welding assemblies 700*a*, 700*b*, 700*c*, and/or 700*d*.

In the depicted example arrangement, the assembly 700 includes the four subassemblies 700*a*, 700*b*, 700*c*, and 700*d*, each including a respective horn/booster device. However, the present disclosure contemplates any number of such subassemblies, such as two, three, five, six, or more. Like the assembly 600 shown in FIG. 6, the assembly 700 allows multiple horns (with flat boosters) to be arranged in a side-by-side configuration and positioned closely together, not limited by the booster, which has the same flat structure as the horn, allowing the horns to be positioned much closer together, such as 2 inches of spacing. To accommodate the diameter of the transducer 704, an extra half wavelength of booster segment 752*a*, 752*b* can be added to alternating boosters 708*b*, 708*d* so that the transducers 704*a*, 704*b*, 704*c*, 704*d* can be positioned in a staggered configuration on the same side 740 of the assembly 700. This allows the transducers 704*a*, 704*c* to be coupled to the boosters 708*a*, 708*c* while the transducers 704*b*, 704*d* are coupled to the boosters 708*b*, 708*d* with the extended half wavelength. In this example, all transducers are arranged on one side 740 of the assembly 700. In other examples, one or more transducers can be arranged on the other side 742 of the assembly 700.

The part-interfacing surfaces 106*a*, 106*b* of the horns 102 disclosed herein, which contact the parts to be sealed refer to a contacting surface of the horn 102 that makes contact with the part to deliver via that surface the ultrasonic energy into the part to be welded (or sealed). The ultrasonic energy passes through the horn 102 away from the welding surface 106*a*, 106*b* and into the respective part that is in contact with the welding surface 106*a*, 106*b* of the corresponding horn 102. Each welding surface 106*a*, 106*b* of the horn 102 makes physical contact with a different area of the part to be welded (the part's sealing interface).

Optionally, in configurations having multiple ultrasonic generators to drive the transducers, the generator outputs can be synchronized in both frequency and phase. The generators (whether separate or integrated with dual outputs) can be arranged in a leader-follower relationship wherein one of the generators is assigned to be a leader. The phase of the leader generator is auto-locked to its ultrasonic stack's feedback using a Phase Lock Loop (PLL), and the leader generator instructs the follower via the communication connection to mimic the same phase at the zero crossings (at 0 or 180 degrees) and ignore the follower's own phase and frequency feedback. This allows the follower's phase to drift in the same manner as the leader. Phase drifts can occur, e.g., due to thermal effects, so by locking the phase of the follower to the leader allows the phase (and therefore by implication the frequency corresponding to the zero crossings of the ultrasonic energy signal's phase) to be synchronized in both transducers when two transducers are present in the assembly 100.

Example frequency of the ultrasonic energy delivered through the transducer 104 disclosed herein can be in a range from 15 to 70 kHz. The amplitude of the ultrasonic energy can be controlled independently on both transducers 104 when two transducers are present. A frequency of 35-70 kHz is particularly suited for sealing smaller or thinner packaging, and lower frequencies of 15-30 kHz can be used for sealing larger or thicker packaging.

An example "scrubbing" operation involves two transducers 104 synchronized in frequency and phase and positioned on opposite ends of the horn with one or both sides of the horns coming into contact to press against a to-be-sealed interface of a part, such as a thin film having a thickness in a range of 10-20 um, 18-100 um, or even over 100 um, or a thin, non-woven material where the thickness can vary along the length of the interface. The variation in thickness can be ±15%-20% or greater at unpredictable locations along the length of the interface. Thus, while the application of energy may be uniform, the thickness of the interface (e.g., which can be composed of just two layers being sealed together) can vary along the length of the interface being sealed together, creating opportunities for small leaks or uneven welding of the seal. The so-called scrubbing action leverages the tiny, mechanical lengthwise motions produced by the horn's vibrating relative to one another as the frequency- and phase-synchronized ultrasonic energy is imparted through the transducers to the horn. These vibrations produce very short, rapid back and forth motions in the horn that resemble a scrubbing movement, which has been found to produce very high quality hermetic seals especially where the interface has a non-uniform thickness or a thick dimension, such as when the interface is a thin film or non-woven material.

While a thin film or non-woven material has been described in these examples, the scrubbing aspects disclosed herein also work with welding metal films, metal foils or thin metals (including dissimilar metals or metal foils), or any combination of thin film, non-woven material, or metals. For example, scrubbing is particularly effective at sealing metals together, but also is effective at sealing dissimilar materials together, e.g., a non-woven material to a metal film or foil.

Figure 2:
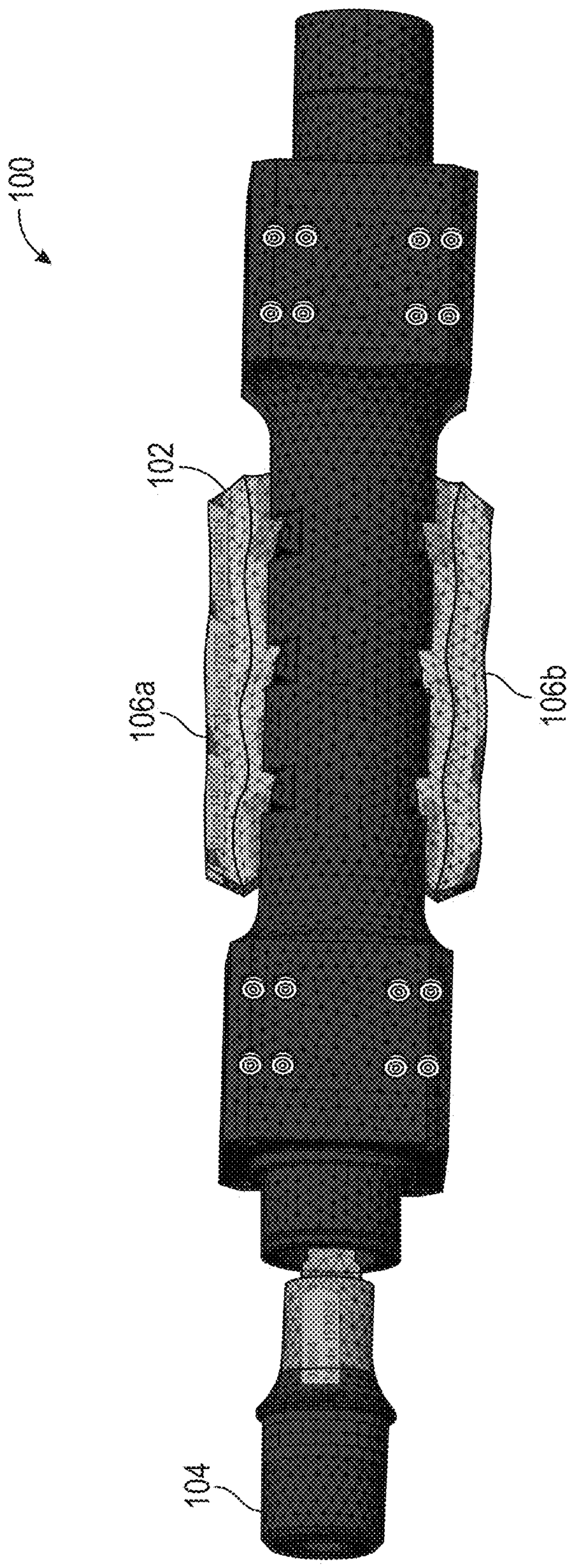
FIG. 2 is a color illustration of an FEA analysis of the assembly shown in FIG. 1A to show an exaggerated direction of flexure or movement of the stack as the transducer imparts ultrasonic energy into the horn via the booster.
Figure 3:
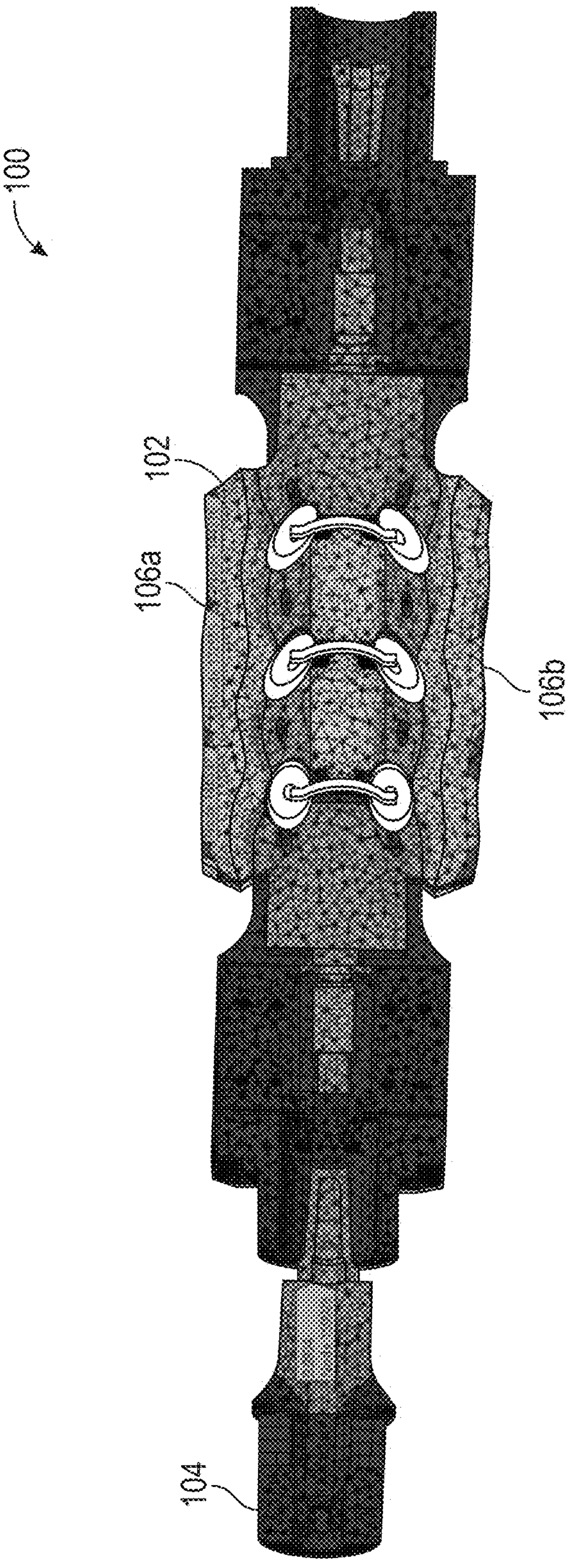
FIG. 3 is a color illustration of the same assembly shown in FIG. 2 with the side plates removed to show the nodal and anti-nodal regions of stress distribution during operation (when ultrasonic energy is imparted by the transducer).

FIG. 2 is a perspective view of the amplitudes through the horn 102 during a scrubbing action, and FIG. 3 is a cross-sectional view of the same. The distortion or displacement of the horn 102 has been exaggerated for ease of illustration, but the images show how the horn 102 moves rapidly back and forth in a lateral direction to create a scrubbing action on its side part-interfacing surfaces 106*a*, 106*b*. When pressed against an anvil, such as the anvil 150 shown in FIG. 1F, the combination of the scrubbing action, which produces heat contributed by the ultrasonic energy, and the mechanical forces pressed against the part to be joined between the horn 102 and anvil 150, produces a seal at the interface where the scrubbing is carried out. This seal can be produced by actuating the horn 102 in and out or by rotating the horn 102 continuously such that it contacts the part twice per rotation.

Figure 4:
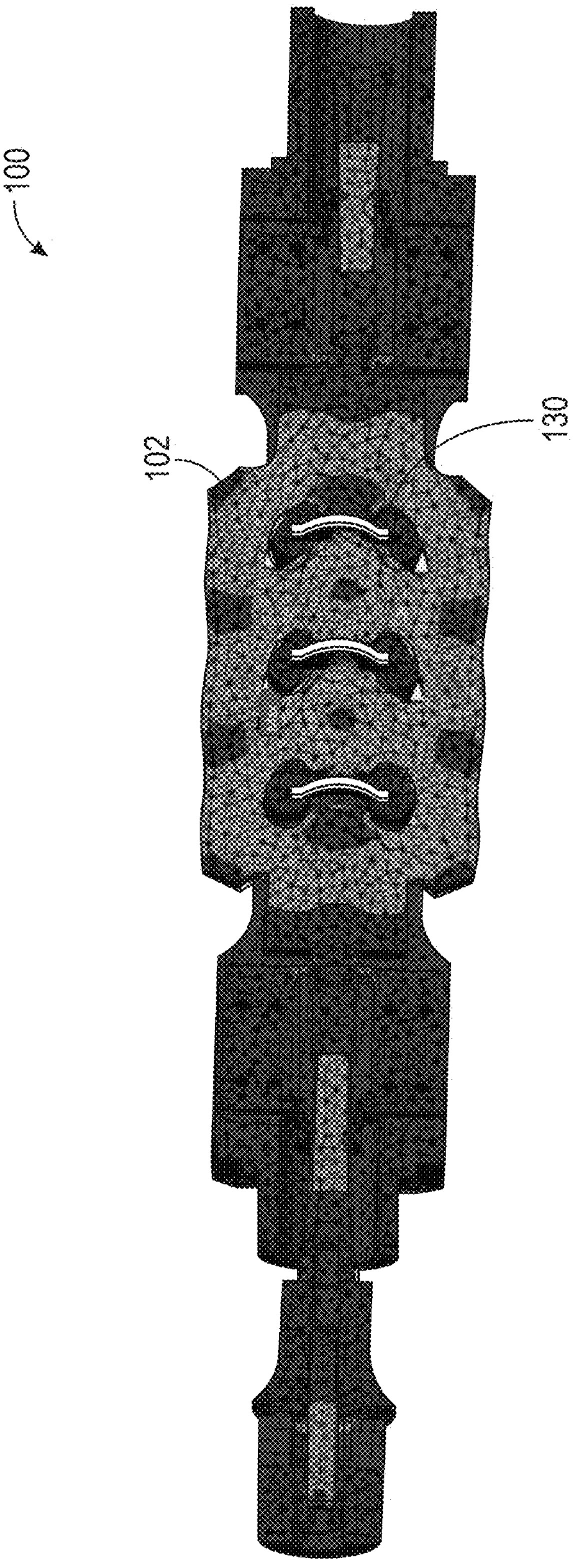
FIG. 4 is a color illustration of a cross-section of the assembly shown in FIG. 3.
Figure 5:
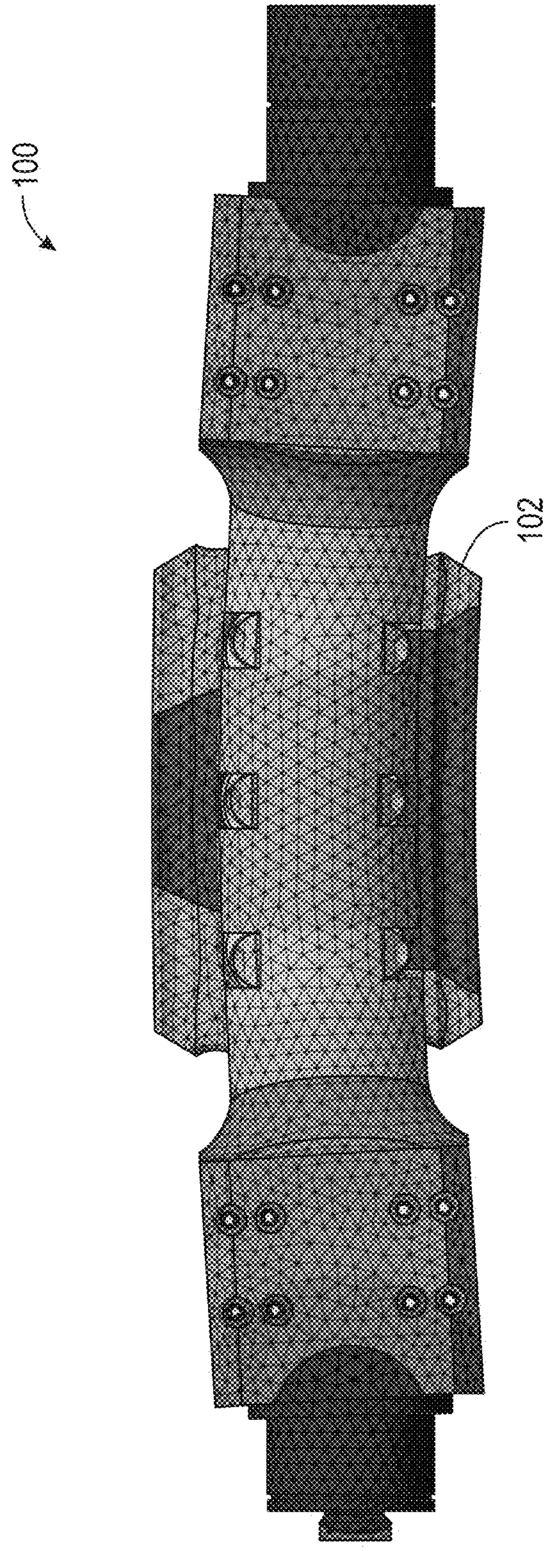
FIG. 5 is a color illustration of an FEA analysis of the assembly shown in FIG. 1A under a deformation load to show the deflection of the horn under the deformation load.

FIG. 4. is a cross-sectional view of a stress distribution across the horn 102 during a scrubbing operation at 20 kHz. Here, the contribution of the compliant tabs 130 can be seen. FIG. 5 illustrates a perspective view of the assembly 100 showing deformation of the assembly 100 under 3000 N of load, where the deformation has been greatly exaggerated for ease of illustration. The mounting plate 140, when present as in this example, provides additional stiffness to the assembly 100 to resist deformation under load. The actual deformation is about 7.8 um or 3/10000$^{th}$ inches.

The horn 102 (or 602, or 702, or 802) disclosed herein can be made of metal, and can be rigidly mounted to a fixed frame or structure via one or more mounting fixed bearing mounts 120*a*, 120*b*, so that rotations of the horn 102 (or 602, or 702, or 802) are uniform and not susceptible to wobble, allowing faster, consistent, and repeatably high quality welds for thousands and thousands of welds for many applications including packaging, flow wrap seal, and non-woven applications. In such a configuration the thin planar nature of this horn permits thicker materials or products to pass through between welds. The height of the materials or products can be up to 40 mm in the example shown.

FIG. 8A illustrates a perspective view of an example arrangement of an ultrasonic cutting horn assembly 800 according to the present disclosure. In at least one example arrangement, the cutting horn assembly 800 can include the same or substantially same components and features as the ultrasonic welding assembly 100, 600 or 700, except that the ultrasonic cutting horn assembly 800 includes a cutting horn 802 instead of the horn 102, 602, or 702. Like the assemblies 600 (shown in FIG. 6) or 700 (shown in FIG. 7), a plurality of cutting horn assemblies 800 can be arranged in a side-by-side configuration and positioned closely together, not limited by the booster, which has the same flat structure as the horn 802, allowing the horns 802 (and/or 602, 702) to be positioned much closer together, such as 2 inches of spacing. Alternatively, one or more cutting horn assemblies 800 can be included in place of a corresponding one or more weld horn assemblies 600 or 700, as discussed in greater detail below.

The ultrasonic cutting horn assembly 800 includes a cutting horn (or blade) 802 having a major surface, integrated planar boosters 808, a transducer 804, and at least one cutting feature 852, and preferably two cutting features 852 formed as cutting edges on opposite sides of, and in the same plane, of the cutting horn 802. The ultrasonic cutting horn assembly 800 can include one or more bearing mounts, such as, for example, the bearing mounts 120 discussed above. In various example arrangements, the cutting horn 802 can include one or more cutting features 852, and/or the ultrasonic boosters 808 do not have to be integrated with the horn 802 and alternately can be coupled to the ultrasonic horn 802 and to the transducer 804. The cutting horn 802 can be operated as a cutting blade, wherein the transducer 804 outputs ultrasonic energy into the cutting horn 802 to operate the cutting horn 802 as a resonant cutting blade. In various example arrangements, the cutting horn 802 is configured to cut by a scrubbing operation or motion and/or by an extending operation or motion.

In an alternate arrangement (not shown), the cutting horn assembly 800 can include a pair of transducers 804, with each transducer 804 coupled via the respective booster 808 at each end of the cutting horn 802. The transducers 804 can be configured to output synchronized ultrasonic energy (in frequency and phase) through the integrated planar boosters 808 into the cutting horn 802.

FIGS. 8B-8G illustrate various views of the cutting horn 802 according to the principles of the disclosure. The cutting horn 802 includes a mounting member 818 at each distal end, and at least one slot 855 located between the mounting members 818. The mounting members 818 can be coupled to, for example, respective ones of the bearing mounts 120*a*, 120*b* (shown in FIG. 1A) to allow rotation of the cutting horn 802 about its longitudinal axis. The mounting member(s) 818 can be integrally formed with the booster(s) 808 and the cutting horn 802 as a single piece, or, in alternative example arrangement, assembled from multiple pieces. The mounting member 818 includes at least one opening for fastening and a body that facilitates operation of the booster 808 along the rotation axis of the cutting horn 802. The cutting horn 802 is configured to rotate about its rotational axis, which is a longitudinal axis that runs lengthwise through the centers of gravity of the transducer(s) 804, the booster(s) 808, the mounting member(s) 818, and the cutting horn 802, or in a linear motion perpendicular to this axis to perform a slicing cut, or a D-shape motion commonly used in continuous applications for packaging In the example arrangement illustrated in FIG. 8A, the cutting horn 802 includes a plurality of slots 855, with each slot having an elongated shape and a length that is perpendicular to the rotational axis of the cutting horn 802.

Figure 8E:
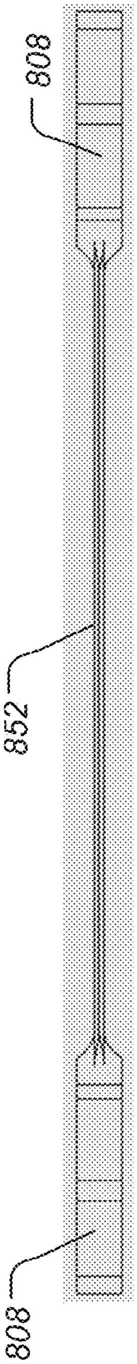
FIG. 8E illustrates a top (or bottom) view of the cutting horn of FIGS. 8A-8C.
Figure 8D:
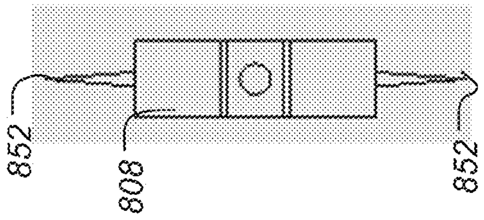
FIG. 8D illustrates an end view of the cutting horn of FIGS. 8A-8C, looking at the cutting horn at one end with the length of the cutting horn perpendicular to point of view.
Figure 8F:
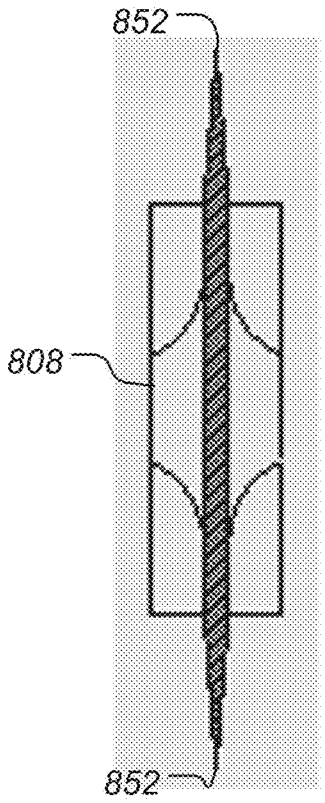
FIG. 8F illustrates a cross-section view of the cutting horn having cutting features with a symmetric arrangement.
Figure 8G:
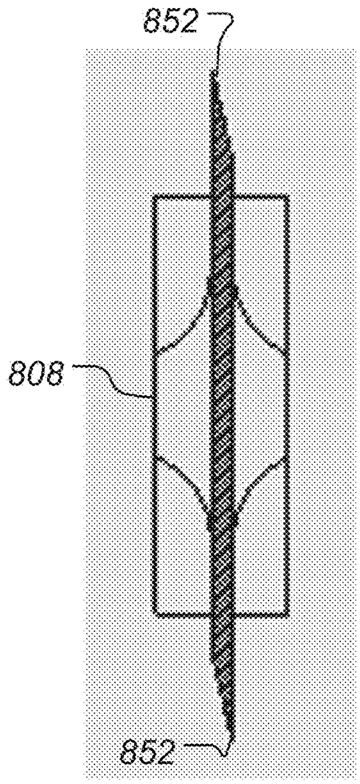
FIG. 8G illustrates a cross-section view of an asymmetric arrangement of the cutting features of the cutting horn.

FIG. 8D illustrates an end view of the cutting horn 802, looking at the cutting horn 802 from one side, with the length of the cutting horn 802 running perpendicular to the illustration (for example, going into the page perpendicularly). FIG. 8E illustrates a top (or bottom) view of the cutting horn 802, including the cutting feature 852. Any of the cutting feature(s) 852 can have a symmetric arrangement as seen in FIG. 8F, or an asymmetric arrangement as seen in FIG. 8F, or a combination of a symmetric and an asymmetric arrangement.

Figure 9A:
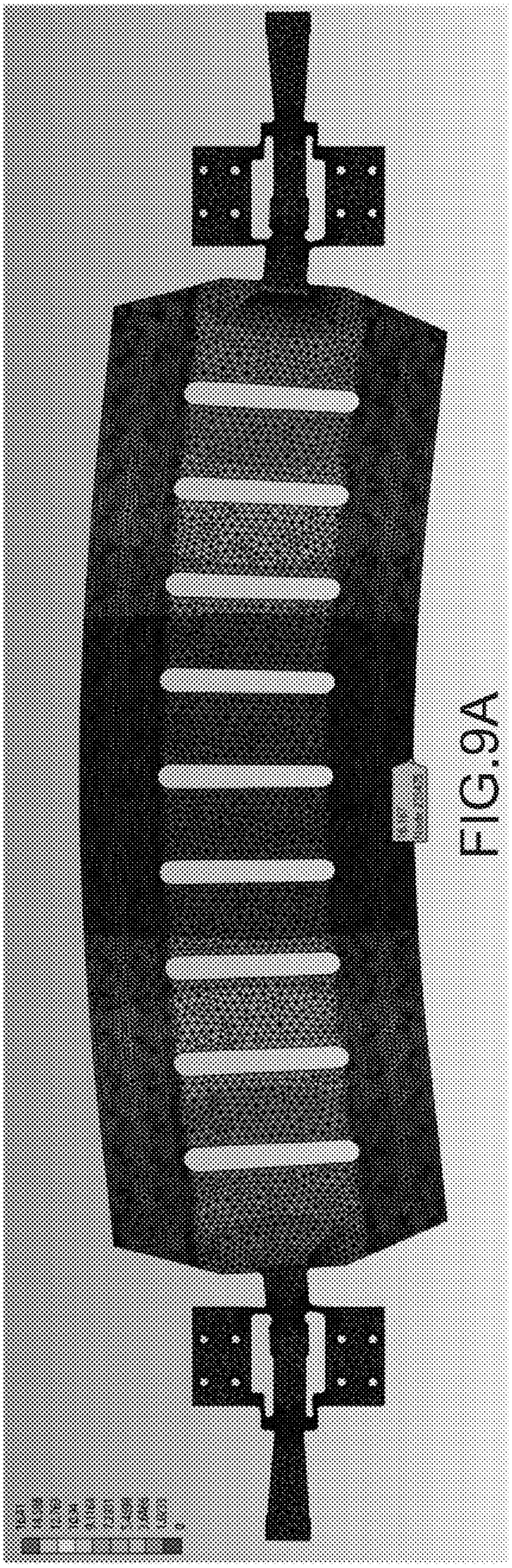
FIG. 9A is a color illustration of an FEA analysis of the cutting horn with cutting features shown in FIGS. 8A-8E under a deformation load to show the deflection of the cutting horn under the deformation load.

FIG. 9A is a color illustration of an FEA analysis of an example arrangement of the cutting horn 802 under a deformation load of about 100 pounds (lbs). As seen, the FEA analysis of the cutting horn 802 comprising the integrated planar boosters 808 experiences a deflection that is substantially less (for example, 24% or more reduction in deflection) than the same cutting blade assembled to state-of-the art round boosters under the same 100 lb deformation load.

Figure 9B:
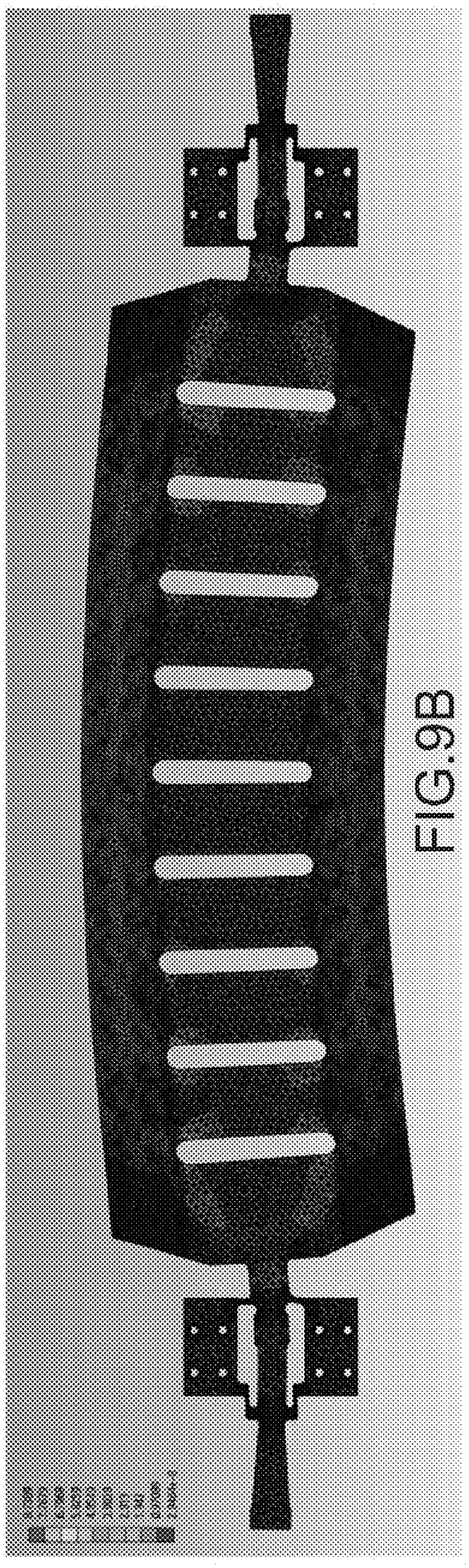
FIG. 9B is a color illustration of a stress analysis of the cutting horn of FIG. 9A under a stress condition to show the deflection of the cutting horn under the stress condition.

Similarly, FIG. 9B is a color illustration of a stress analysis of the cutting horn 802 under the same 100 lb load. As seen, the stress analysis of the cutting horn 802 comprising the integrated planar boosters 808 experiences substantially less stress (for example, 42% or more stress reduction) compared to the same cutting blade assembled to state-of-the art round boosters under the same 100 lb stress load.

Figure 9C:
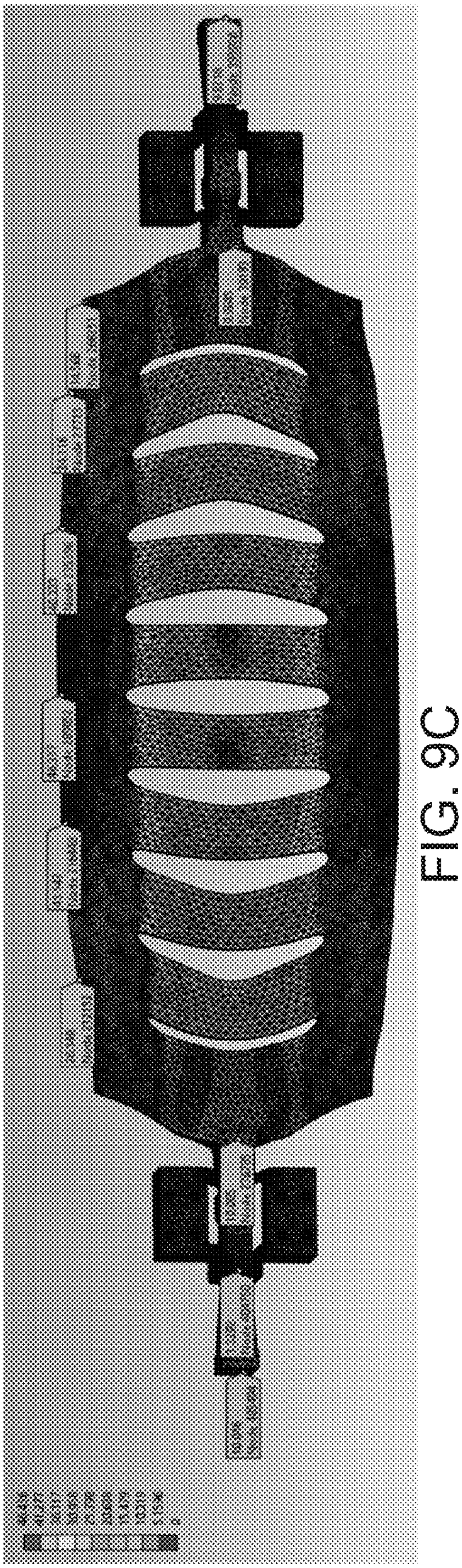
FIG. 9C is a color illustration of an FEA analysis of the cutting horn of FIGS. 9A, 9B under an ultrasonic amplitude condition to show the harmonic response of the cutting horn, including deflection of the cutting horn.

FIG. 9C is a color illustration of an FEA analysis of the harmonic response of the cutting horn 802 when ultrasonic energy is applied having a frequency of 19.869 kHz and a sweeping phase of 180°. As seen in the illustration, which is exaggerated for illustrative purposes, nodes are formed along the cutting features 852 and optimal locations along the integrated boosters 808, facilitating smoothing and uniform cutting of material by the cutting features 852.

Figure 9D:
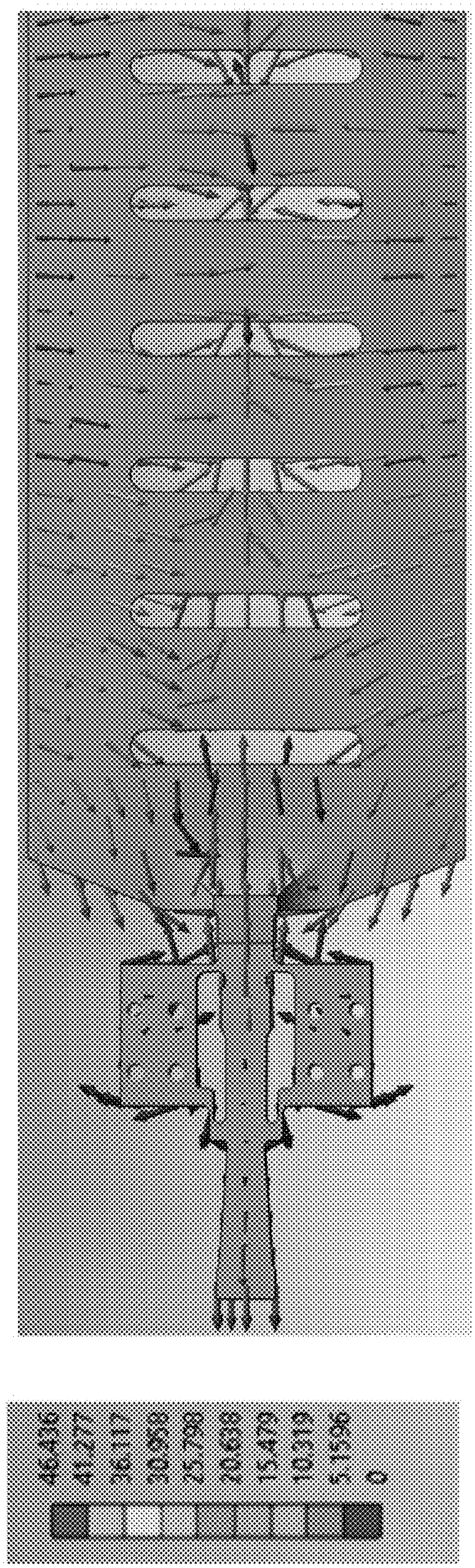
FIG. 9D is a color illustration of an FEA analysis of the cutting horn of FIGS. 9A, 9B under the ultrasonic amplitude condition to show a vector representation of motion of the cutting horn, as the cutting horn undergoes deflection.
Figure 9E:
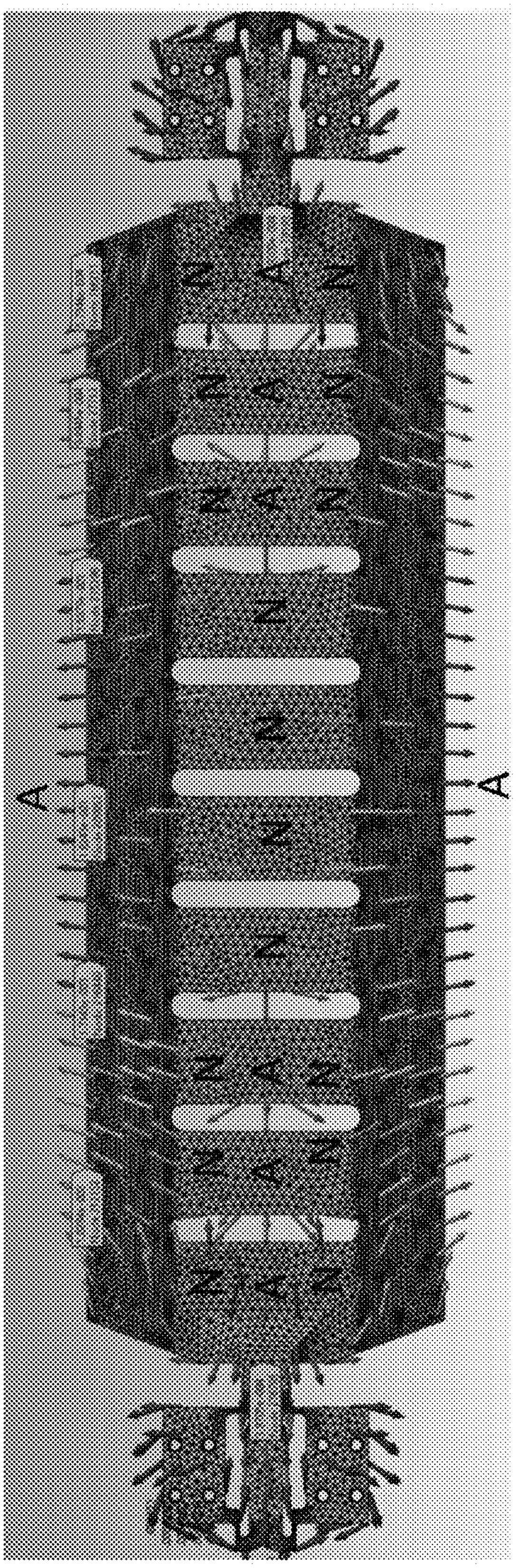
FIG. 9E is a color illustration of the FEA analysis of the overall cutting horn of FIGS. 9A, 9B including integrated boosters and mounting member.

FIG. 9D is an enlarged color illustration of an FEA analysis of one end portion of the cutting horn 802, showing a vector representation of motion of the integrated booster 808, mounting member 818, and part of the cutting blade; and, FIG. 9E is a color illustration of the FEA analysis of the overall cutting horn 802, including the integrated boosters 808 and mounting members 818. As seen in the illustrations in FIGS. 9D and 9E, the paddle structure of the cutting horn 802 has a much longer transition between scrubbing (i.e., two vertical nodes N) and elongation (i.e., one vertical node N).

Figure 10:
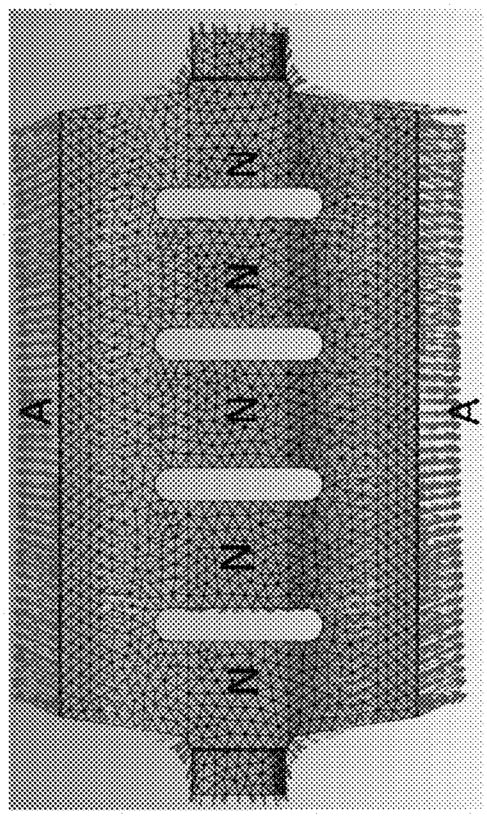
FIG. 10 is a color illustration of an FEA analysis of a traditional cutting blade.
Figure 11:
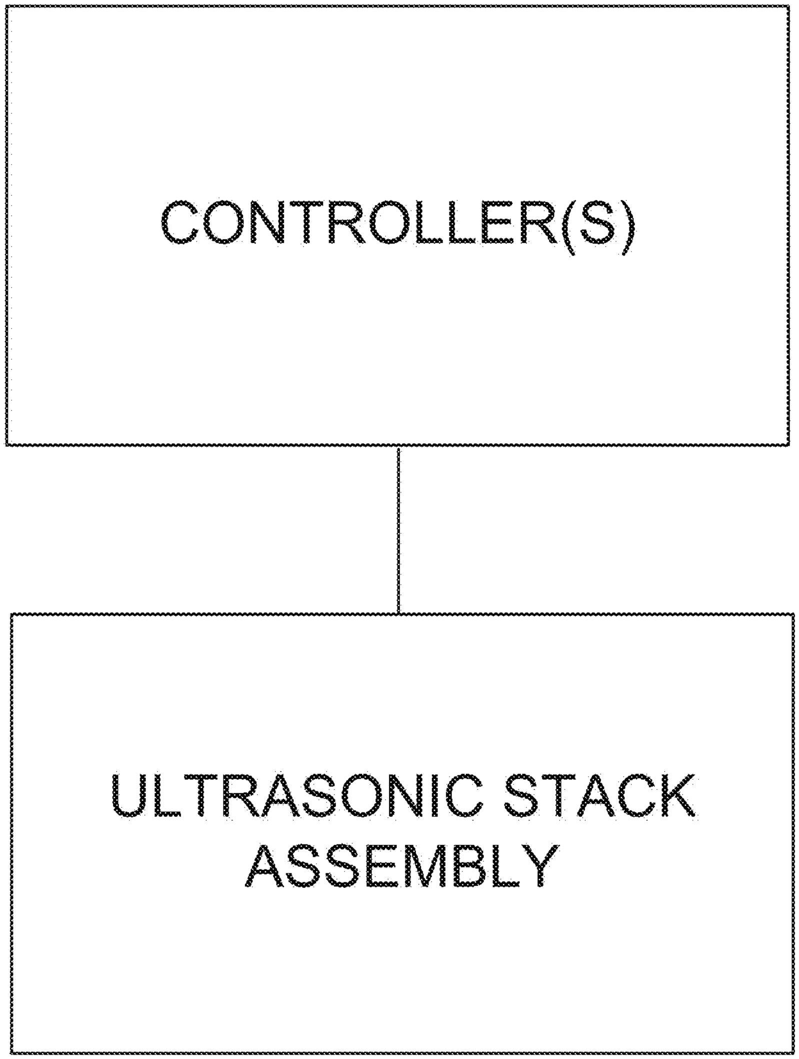
FIG. 11 is a nonlimiting embodiment of an ultrasonic welding system.

FIG. 10 is an illustration of an FEA analysis of a traditional cutting blade. Comparing the FEA analyses of the paddle structure of the cutting horn 802 (FIG. 9E) and the traditional cutting blade (FIG. 10), it is evident that the traditional cutting blade has a clear transition between the nodes N in the middle and the antinodes A at the faces; whereas the cutting horn 802 has antinodes A along the cutting features 852, and pairs of vertical nodes N separated by vertical antinodes A in the scrubbing sections, which are located on either side of an elongated center section comprising single vertical nodes N.

As the cutting horn 802 is cutting through material, the transducer(s) 804 introduce ultrasonic energy via the internal booster 808 into the cutting horn 802 (via boosters 808 simultaneously in the case of dual transducers 804), causing the cutting horn 802 to vibrate in a push-pull manner toward and away from the transducer 804. The transducer(s) 804, booster(s) 808 and cutting horn 802 are configured to generate a consistent, even amplitude along the cutting edges 852 of the cutting horn 802. The cutting horn assembly 800, and particularly the cutting horn 802, can be configured to cut through material having a thickness that exceeds a height of the cutting feature 852.

In various arrangements, the cutting horn assembly 800 can be positioned adjacent an ultrasonic welding assembly, such as, for example, the ultrasonic stack assembly 100 (seen in FIG. 1A). In at least one arrangement, the cutting horn assembly 800 is positioned between a pair of adjacent ultrasonic welding assemblies, such as, for example, the ultrasonic stack assemblies 600*a* and 600*c* (or 600*b* and 600*d*) seen in FIG. 6, or the ultrasonic stack assemblies 700*a* and 700*c* (or 700*b* and 700*d*) seen in FIG. 7. For example, the ultrasonic stack assemblies 600*b* and 600*d* can be removed and replaced by a pair of the cutting horn assemblies 800. Similarly, the ultrasonic stack assemblies 700*b* and 700*d* can be removed and replaced by the pair of the cutting horn assemblies 800.

Referring to FIG. 1F, in the example arrangement comprising the cutting horn assembly 800 by itself, the cutting feature 852 can be moved (or rotated), for example, toward the anvil 150, and ultrasonic energy applied to the cutting horn 802 by means of the ultrasonic transducer 804 to cut a part via scrubbing or extending/retracting actions. The part can include, for example, a multilayer planar material such as a sheet, a film, or a section of material. The multilayer material can be supplied from a roll (not shown) and intermittently or continuously fed in between one or more horns 102/602/702/802 and/or the anvil 150 (shown in FIG. 1F) such that the multilayer material can be sealed-and-cut (or cut-and-sealed) into individual, discrete sections that are, for example, hermetically sealed around the entire perimeter (or a part thereof) of each section to form a container for articles such as, for example, food, powder, liquid, and the like. The material can include, for example, a textile, a plastic, a non-woven material, a metal, or other material that can be cut, welded, and/or sealed using an ultrasonic stack assembly according to the principles of the disclosure. The part can be an article having a multi-dimensional (e.g., 3D) structure, including a height dimension, a width dimension, and/or a length dimension.

In at least one application, the article is a multilayer material that is unrolled from a roll and fed continuously or intermittently to the ultrasonic stack assembly, for example, to weld/seal the material via the part-interface surfaces 106*a* (e.g., seen in FIG. 1C) and cut the material via the cutting features 852 (e.g., seen in FIG. 8A) into sections having equal or different lengths.

For example, in the hybrid weld/seal-cut ultrasonic stack assembly discussed above, comprising the cutting horn assembly 800 adjacent to, or sandwiched between the pair of ultrasonic stack assemblies 600*a*, 600*c* (or 700*a*, 700*c*), the assemblies 600*a* and 600*c* can be operated to form one or more longitudinal welds or seals in the material, and the cutting horn assembly 800 can be operated to cut the material adjacent to or between the longitudinal welds/seals. Various arrangements are contemplated including providing the hybrid ultrasonic stack assemblies with anvil(s) 150 such that the material is fed therebetween, or providing one or more sets of dual opposing hybrid stack assemblies. In the latter arrangements, the ultrasonic weld/seal assemblies 600 (or 700) can be positioned such that their respective part-interfacing surfaces 106*a* align during welding/sealing so as to sandwich the multilayer material therebetween, and the cutting horn assembly 800 can be provided opposite a weld/seal assembly 600 (or 700), the anvil 150, or used without either device, in which case the material can be tensioned by, for example, the assemblies 600*a*, 600*c* on either side of the cutting horn assembly 800 as the cutting horn 802 cuts the section of material therebetween. Accordingly, the part can be welded or sealed (e.g., hermetically sealed) by the weld/seal assemblies 600*a*, 600*c* (or 700*a*, 700*c*) and cut between the welds/seals by the cutting horn assembly 800 into sections.

In the example arrangements of the hybrid weld/seal-cut ultrasonic stack assembly that includes the cutting horn assembly 800 and adjacent horn assembly 100, or the cutting horn assembly 800 sandwiched between the pair of horn assemblies 600*a*, 600*c* (or 700*a*, 700*c*), the combination of the horn assembly 100 (or 600 or 700) and the cutting horn assembly 800 can be configured as an ultrasonic "cut and seal" or "seal and cut" assembly. In the former example arrangement, the ultrasonic transducer 104 can apply ultrasonic energy to the horn 102, which can capture an article such as a roll of multilayer material (not shown between the horn 102 and the anvil 150 (shown in FIG. 1F), or another horn 102 (not shown), and ultrasonically weld or seal a width (or length) of the multilayer material equal to the length of the part-interfacing surface 106*a* (or 106*b*). The seal can include a hermetic seal such that, for example, the sealed section of the article can be used to hold a fluid in certain applications, such as, for example, food and/or drink applications.

In the latter example arrangement of the hybrid ultrasonic stack assembly, the ultrasonic transducer 604 (or 704) can apply ultrasonic energy to the adjacent horn 602 (or 702) to ultrasonically weld or seal a width (or length) of the multilayer material equal to the length of the part-interfacing surface 106*a* (or 106*b*), or the ultrasonic transducers 604 (or 704) can apply ultrasonic energy to respective ones of the pair of horns 602 (or 702) on either side of the cutting horn 802 to ultrasonically weld or seal a width (or length) of the multilayer material equal to the length of the part-interfacing surface 106*a* (or 106*b*) on each side of the cutting horn 802. In various arrangements, before, after, or as the part-interfacing surface(s) 106*a* (or 106*b*) weld/seal the layers of the multilayer material to each other, the cutting horn 802 can be energized to cut the width of the multilayer material between the welds/seals.

In both example arrangements, the horn(s) 102/602/702/802 and transducer(s) 104/604/704/804 cooperate to cause the ultrasonic energy to apply a scrubbing (or extending) action to the layers of material while welding/sealing the layers to each other by the horns 102/602/702 and/or cutting the layers by the horn 802.

In the example arrangements, sections of an article (for example, pouch or pillow container) can be formed from the multilayer material by operating the cutting horn 802 to cut the material into equal (or different) length sections and simultaneously (or at different times) welding or sealing portions (for example, edges) of the sections by operating one or more of the horns 102/602/702 such that any number of portions of each section are sealed, including, for example, portions of each section hermetically sealed on at least one, two, three, or all four sides of a rectangular-shaped section. In this regard, the horn 102/602/702 is energized to weld/seal the layers of the sheet to each other along the length of the part-interfacing surface 106*a* (or 106*b*) and simultaneously (or subsequently) cut the multilayer material, for example, near the weld/seal, by the cutting feature 852 of the horn 802, wherein the cutting feature 852 can be configured to have the same or longer length than the part-interfacing surface 106*a* (or 106*b*).

In the example arrangements, each section of multilayer material can be sealed at both, opposite, ends. In this regard, the adjacent pair of horns 602 (or 702) are both energized to weld the layers of the sheet to each other along the length of each of the respective part-interfacing surfaces 106*a* (or 106*b*) on the adjacent pair of horns 602 (or 702). At the same time as, or immediately after, welding/sealing the multiple layers to each other by the pair of horns 602 (or 702), the horn 802 can be energized by the transducer 804 to cut, by the cutting feature 852, the section of material between the adjacent pair of welds formed by the horns 602 (or 702). Then, as the cut section is removed and the next section of multilayer material fed between the horns 102/602/702/802 and/or anvil 150 (shown in FIG. 1F), welds/seals are formed perpendicular to the feed direction at both, opposite, ends of each section. In the example arrangements, the cutting feature 852 can be configured to have the same or longer length than each of the part-interfacing surfaces 106*a* (or 106*b*) on the adjacent pair of horns 602 (or 702).

In various example arrangements, the hybrid ultrasonic stack assembly can be operated to make a multitude of types and sizes of pouches or pockets from a multilayer material. For instance, pouches or pockets can be formed by hermetically sealing the entire perimeter of each multilayer section such as, for example, before or after the resultant pouch or pocket is filled with content matter (e.g., liquid, a food, powder, or the like). So-called pillow pouches or bags are well known in the packaging industry, and traditionally, they are formed along a continuous roll, and then conventionally sealed using heat and then later cut to singulate the pouches from the roll into individual items. Only those structures and devices that are pertinent to carrying out the disclosure are described here, because it is assumed that the person skilled in the packaging arts, and in particular pillow pouch packaging will be very familiar with machines that are employed to fill, seal, and cut the roll into individual pouches.

The seal in some applications must be hermetic, air tight, or must contain a liquid without any leaks. Conventional techniques to seal these interfaces are extremely wieldy, expensive, and can require multiple passes over the same interface to complete the seal, requiring a lengthy amount of time for each item to be sealed. Some preparation or manipulation of the item and/or its seal interface must also be carried out before the seal can be formed. These preparations or manipulations cause additional delays in the sealing process.

While some materials have been described herein as being suitable for sealing or welding using the synchronized dual-horn ultrasonic energy applications disclosed herein, including plastic and non-woven film, the present disclosure contemplates sealing or welding other types of same or dissimilar materials together, including parts made from polyester printed to aluminum then laminated to polyethylene, metal including aluminum, metal foil, fabric, film, polyethylene-coated fiberboard or liquid paperboard, and the like. The scrubbing motion or cross-seal aspects herein are particularly well suited for mono-layer plastic films, bioplastics, biodegradable or recyclable materials, which are not particularly well-suited for heat sealing but seal very well when ultrasonic energy is applied at the seal interface. Thinner layers can be sealed consistently and even hermetically according to the aspects disclosed herein.

Advantages of the systems and methods disclosed herein include:

Longer welding surfaces along the horn.

Minimal interfaces (fewer compared to conventional transducer-booster-horn configurations).

Stiffer assembly resistant to deformation under load.

Ability to maximize height of the horn, leading to greater cross-sectional moment of inertia and less bending of the horn.

Multiple horns can be placed side-by-side in a stacked configuration.

Horn assembly with high stiffness but a small footprint and densely packed assembly.

Uniform application of ultrasonic force across the entire width of the interface on the part to be sealed.

High throughput rate with high force application.

What is claimed is:

1. An ultrasonic system, the system comprising:

an ultrasonic cut stack assembly including an ultrasonic cutting horn and a first transducer arranged to impart a first ultrasonic energy into the ultrasonic cutting horn, the ultrasonic cutting horn having a first cutting feature configured to contact a part to be cut, the ultrasonic cutting horn having a major surface adjacent to the cutting feature and an ultrasonic booster having a flat shape and a major surface that is coplanar with the major surface of the ultrasonic cutting horn;

one or more controllers operatively coupled to the ultrasonic cut stack assembly, the one or more controllers operatively being configured to:

apply the first ultrasonic energy through the ultrasonic cut horn via the first transducer to cause the first cutting feature to move back and forth along its length as the first ultrasonic energy is applied by the first transducer to the cutting horn, wherein the ultrasonic cutting horn and the ultrasonic booster are machined from a single plate of metal such that the ultrasonic cutting horn and the ultrasonic booster constitute a single, integrated piece.

2. The system of claim 1, the ultrasonic cut stack assembly including a second transducer arranged to impart a second ultrasonic energy into the cutting horn, the one or more controllers being configured to cause the second ultrasonic energy to be applied through the ultrasonic cutting horn simultaneously with the first ultrasonic energy, wherein the first and second ultrasonic energies are synchronized in at least one of frequency or phase.

3. The system of claim 2, wherein the first and second ultrasonic energies are synchronized in both frequency and phase.

4. The system of claim 1, wherein the ultrasonic cutting horn has a length along a side thereof and a width along an end thereof, the length being longer than the width, and the ultrasonic booster extending away from the end of the ultrasonic cutting horn, the end being interfaced with the first transducer, and wherein the ultrasonic cutting horn and the ultrasonic booster have a generally flat profile along coplanar surfaces thereof.

5. The system of claim 1, further comprising:

an ultrasonic stack assembly having an ultrasonic horn and a transducer arranged to impart ultrasonic energy into the ultrasonic horn, the ultrasonic horn having a part-interfacing surface configured to contact a portion of the part to be welded or sealed, the ultrasonic horn having a major surface adjacent to the part-interfacing surface and an ultrasonic booster having a flat shape and a major surface that is coplanar with the major surface of the ultrasonic horn, wherein a weld or seal is formed at the part-interfacing surface without application of any external heat energy toward the weld or seal.

6. The system of claim 5, wherein the ultrasonic horn includes a compliant tab that is internal to the ultrasonic horn and configured to connect with a plate arranged on an exterior of the ultrasonic horn.

7. The system of claim 6, wherein the tab is a plurality of tabs, each being internal to the ultrasonic horn and configured to connect with respective mounting points on the plate to provide a node to inhibit internal movement or deflection of the ultrasonic horn relative to anti-nodal points along the ultrasonic horn.

8. The system of claim 6, wherein the compliant tab extends into an opening in the ultrasonic horn formed along an internal surface of the ultrasonic horn and is attached to the plate.

9. The system of claim 5, wherein the ultrasonic cutting horn and the ultrasonic weld or seal horn are positioned side by side relative to one another, each of the ultrasonic cutting horn and the ultrasonic weld or seal horn being integrated with or coupled to a generally flat ultrasonic booster, said first transducer and the weld/seal transducer being on opposite sides of the ultrasonic stack assembly.

10. The system of claim 5, wherein the ultrasonic cutting horn and the ultrasonic weld or seal horn are positioned side by side relative to one another, each of the ultrasonic cutting horn and the ultrasonic weld or seal horn being integrated with or coupled to a generally flat ultrasonic booster, said first transducer and the weld/seal transducer being on the same side of the ultrasonic stack assembly.

11. The system of claim 5, further comprising an anvil arranged at a distance from the first part-interfacing surface of the ultrasonic weld or seal horn, the anvil arranged relative to the first part-interfacing surface of the ultrasonic weld or seal horn to seal a portion of the part or weld the portion of the part to another part to be joined.

12. The system of claim 1, the ultrasonic cutting horn having a second cutting feature along an opposite side to a side of the first cutting feature.

13. The system of claim 1, the ultrasonic cut stack assembly further including a fixed bearing mount through which a portion of the ultrasonic booster passes to interface with the first transducer.

14. The system of claim 13, wherein the portion of the ultrasonic booster that passes through the fixed bearing mount modifies a vibrational amplitude passing between the first transducer and the ultrasonic cutting horn such that the portion of the ultrasonic booster has a reduced width dimension relative to an overall width dimension of the ultrasonic cutting horn.

15. The system of claim 14, wherein the modification is a tuned half-wave component relative to the first ultrasonic energy.

16. The system of claim 1, the ultrasonic cutting horn having a second cutting feature that is on an opposite side of the first cutting feature, and wherein the one or more controllers is configured to cause the ultrasonic cutting horn to rotate while at least the first ultrasonic energy is imparted to at least one of the first cutting feature or the second cutting feature.

17. The system of claim 1, wherein the ultrasonic booster is coupled to the ultrasonic cutting horn and to the first transducer, the ultrasonic booster having a generally square or rectangular cross-section.

18. The system of claim 1, wherein the ultrasonic booster is a tuned as a half-wave component.

19. The system of claim 1, wherein the cutting horn comprises a plurality of slots, each slot having an elongated shape.

* * * * *